US012627887B2

(12) United States Patent
Jang et al.

(10) Patent No.: US 12,627,887 B2
(45) Date of Patent: May 12, 2026

(54) SENSOR SHIFTING MODULE AND CAMERA MODULE INCLUDING THE SAME

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 189 days.

(21) Appl. No.: 17/966,154

(22) Filed: Oct. 14, 2022

(65) Prior Publication Data

US 2023/0156328 A1     May 18, 2023

(30) Foreign Application Priority Data

Nov. 18, 2021     (KR) ........................ 10-2021-0159647

(51) Int. Cl.
H04N 23/67 (2023.01)
H04N 23/54 (2023.01)
(Continued)

(52) U.S. Cl.
CPC ........... H04N 23/675 (2023.01); H04N 23/54 (2023.01); H04N 23/55 (2023.01); H04N 23/687 (2023.01)

(58) Field of Classification Search
CPC ...... H04N 23/675; H04N 23/54; H04N 23/55;

H04N 23/687; H04N 23/57; H04N 23/67; G02B 27/646; G02B 7/09; G03B 13/36; G03B 30/00; G03B 3/00; G03B 2205/0069; G03B 2205/0061; H02K 33/18

See application file for complete search history.

(56) References Cited

U.S. PATENT DOCUMENTS 7,692,689 B2 *    4/2010   Teramoto ........... H04N 23/6812
                                                    348/208.7
10,656,373 B1 *   5/2020   Bardagjy ............. H02K 41/031
                  (Continued)

FOREIGN PATENT DOCUMENTS

CN          112702534 A  *  4/2021   ........... H04N 5/2251
CN          112839176 A     5/2021
                  (Continued)

OTHER PUBLICATIONS

Korean Office Action issued on Feb. 20, 2023, in counterpart Korean Patent Application No. 10-2021-0159647 (6 pages in English, 5 pages in Korean).

(Continued)

*Primary Examiner* — Abdelaaziz Tissire
(74) *Attorney, Agent, or Firm* — NSIP Law

(57)        ABSTRACT

A camera module is provided. The camera module includes a housing; a carrier, disposed in the housing, and configured to move in a first direction; an image sensor movably disposed in the carrier and having an imaging plane oriented in the first direction; and an autofocusing driver including an autofocusing actuator configured to move the carrier in the first direction with respect to the housing and a ball member disposed between the carrier and the housing.

24 Claims, 19 Drawing Sheets

(51) Int. Cl.
    *H04N 23/55*      (2023.01)
    *H04N 23/68*      (2023.01)

(56)                References Cited

U.S. PATENT DOCUMENTS

| | | | | |
|---|---|---|---|---|
| 10,890,734 B1 | 1/2021 | Sharma et al. | | |
| 11,223,756 B1 * | 1/2022 | Sharma | | G03B 30/00 |
| 2006/0269262 A1 * | 11/2006 | Shin | | G03B 5/02 |
| | | | | 348/E5.046 |
| 2006/0269263 A1 * | 11/2006 | Kim | | H04N 23/68 |
| | | | | 348/E5.046 |
| 2007/0025710 A1 * | 2/2007 | Shin | | H04N 23/68 |
| | | | | 348/E5.046 |
| 2008/0049109 A1 * | 2/2008 | Teramoto | | H04N 23/6812 |
| | | | | 348/E5.025 |
| 2011/0050921 A1 * | 3/2011 | Noto | | H04N 23/68 |
| | | | | 348/208.7 |
| 2011/0103782 A1 * | 5/2011 | Tsuruta | | H04N 23/55 |
| | | | | 359/557 |
| 2012/0049660 A1 * | 3/2012 | Park | | B06B 1/045 |
| | | | | 310/25 |
| 2013/0100304 A1 * | 4/2013 | Wade | | G02B 27/646 |
| | | | | 348/208.4 |
| 2014/0063326 A1 * | 3/2014 | Tanabe | | H04N 23/57 |
| | | | | 348/345 |
| 2015/0350499 A1 * | 12/2015 | Topliss | | H04N 23/54 |
| | | | | 348/373 |
| 2016/0127646 A1 * | 5/2016 | Osborne | | H04N 23/6812 |
| | | | | 396/55 |
| 2020/0314338 A1 * | 10/2020 | Johnson | | H04N 23/68 |
| 2021/0199918 A1 | 7/2021 | Lee et al. | | |
| 2021/0271049 A1 | 9/2021 | Seo et al. | | |
| 2025/0044667 A1 * | 2/2025 | Kim | | G03B 13/36 |

FOREIGN PATENT DOCUMENTS

| | | | |
|---|---|---|---|
| CN | 113126232 A | | 7/2021 |
| CN | 213690191 U | | 7/2021 |
| CN | 113325652 A | | 8/2021 |
| JP | 2012-103376 A | | 5/2012 |
| JP | 5453220 B2 | | 3/2014 |
| KR | 10-2020-0088729 A | | 7/2020 |
| KR | 10-2021-0083154 A | | 7/2021 |
| KR | 20210083154 A | * | 7/2021 |

OTHER PUBLICATIONS

Chinese Office Action Issued on Apr. 17, 2025, in Counterpart Chinese Patent Application No. 202211428302.X (4 Pages in English, 8 Pages in Chinese).

* cited by examiner

SENSOR SHIFTING MODULE AND CAMERA MODULE INCLUDING THE SAME

CROSS-REFERENCE TO RELATED APPLICATIONS

This application claims the benefit under 35 USC § 119 (a) of Korean Patent Application No. 10-2021-0159647 filed on Nov. 18, 2021, in the Korean Intellectual Property Office, the entire disclosure of which is incorporated herein by reference for all purposes.

BACKGROUND

1. Field

The following description relates to a sensor shifting module and a camera module including the same.

2. Description of Related Art

With the development of communications technology, mobile devices, such as, but not limited to, smartphones, have been widely distributed, and accordingly, the demand for increased functionalities of cameras included in mobile devices has also been increased. For example, a camera included in a mobile device may be implemented to provide advanced imaging functions (e.g., an autofocus function, an anti-shake function, and the like) implemented in a typical digital single-lens reflex (DSLR) camera despite a small size thereof.

An optical image stabilization (OIS) function may be to prevent image blurring from occurring when a camera is shaken during the exposure time, and the OIS function may be necessary when imaging in low-light environments in which a camera is shaken and the exposure time is long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator is necessary, it may be complicated to be implemented as a device, and although relevant costs are expensive, excellent compensation performance may be obtained.

Since a lens barrel includes an optical system therein, a relatively large amount of force may be necessary to drive the lens barrel. Since an image sensor is relatively light-weight, it may be advantageous to implement an excellent optical image stabilization (OIS) function even with a relatively small force.

A camera implemented in a mobile device may mainly provide a shaking correction function that prevents only the shaking in a direction orthogonal to an optical axis when obtaining an image. Recently, mobile devices have been used to obtain videos, and accordingly, it has been necessary to move an image sensor in more various directions to correct shaking in a more dynamic environment.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing; a carrier, disposed in the housing, and configured to move in a first direction; an image sensor movably disposed in the carrier; and an autofocusing driver comprising an autofocusing actuator configured to move the carrier in the first direction with respect to the housing, and a ball member disposed between the carrier and the housing.

The image sensor may have an imaging plane oriented in the first direction.

The autofocusing actuator may include an autofocusing coil disposed on a first side of the carrier and coupled to one of the housing and the carrier, and an autofocusing magnet coupled to the other of the housing and the carrier and opposing the autofocusing coil in a direction orthogonal to the first direction.

The camera module may include a yoke disposed on one side of the autofocusing coil.

The autofocusing actuator may include an autofocusing coil disposed below the carrier and coupled to one of the housing and the carrier, and an autofocusing magnet coupled to the other of the housing and the carrier and opposing the autofocusing coil in the first direction.

The camera module may include a first elastic member disposed between the carrier and the housing, wherein the ball member may be disposed on a first side of the carrier, and the first elastic member is disposed on a second side of the carrier, and is configured to push the carrier toward the ball member.

The camera module may include a second elastic member disposed between a lower portion of the carrier and the housing, and configured to support the carrier in the first direction.

The camera module may include a first movable body movably disposed in the carrier; a second movable body movably disposed in the first movable body and coupled to the image sensor; a first driver configured to move the second movable body in a direction orthogonal to the first direction with respect to the first movable body; a second driver configured to rotate the second movable body about an axis parallel to the first direction with respect to the first movable body; and a third driver configured to rotate the first movable body about an axis orthogonal to the first direction with respect to the carrier, wherein the third driver is disposed between the carrier and the first movable body and provides a tilt center of the first movable body with respect to the carrier.

The first driver may include a first actuator disposed between the first movable body and the second movable body, and the first actuator may include a first driving magnet disposed on the second movable body, and a first driving coil disposed on the first movable body to oppose the first driving magnet in a direction orthogonal to the first direction.

The second driver may include a second actuator disposed between the first movable body and the second movable body, and the second actuator may include a second driving magnet disposed on the second movable body, and a second driving coil disposed on the first movable body to oppose the second driving magnet in a direction orthogonal to the first direction.

The second movable body may include four side surfaces which form a quadrangular shape, and the first driving magnet and the second driving magnet are disposed on different side surfaces among the four side surfaces.

The second movable body may include a first side surface and a second side surface which form a corner, and the second driving magnet is disposed on one of the first side surface and the second side surface, and is disposed adjacent to the corner.

The third driver may include a third actuator disposed between the first movable body and the carrier, and the third actuator may include a third driving magnet disposed on the second movable body, and a third driving coil disposed on the carrier to oppose the third driving magnet in the first direction.

The third driving magnet may be one of the first driving magnet and the second driving magnet.

The camera module may include a substrate which mechanically connects the second movable body to the first movable body, and is deformed based on a movement of the second movable body with respect to the first movable body.

The substrate may include electrical wirings which are electrically connected to the image sensor.

The substrate may include a movable portion fixedly coupled to the second movable body, a fixed portion fixedly coupled to the first movable body, and a supporting portion that interconnects the movable portion and the fixed portion, and wherein the supporting portion may include a plurality of bridges configured to embed the electrical wirings therein.

The supporting portion may include a guide disposed between the movable portion and the fixed portion, and connected to the movable portion and the fixed portion through the plurality of bridges.

In a general aspect, a camera module includes a housing; a carrier, disposed in the housing, and configured to move in a first direction; a first movable body movably disposed in the carrier; a second movable body movably coupled to the first movable body; an image sensor coupled to the second movable body, and having an imaging plane oriented in the first direction; and a substrate that mechanically connects the second movable body to the first movable body, and is configured to deform based on a movement of the second movable body with respect to the first movable body.

The substrate may include a movable portion fixedly coupled to the second movable body, a fixed portion fixedly coupled to the first movable body, and a supporting portion that interconnects the movable portion and the fixed portion, wherein the supporting portion may include a plurality of bridges embedding electrical wirings electrically connected to the image sensor therein.

The camera module may include a first driver configured to move the second movable body in a direction orthogonal to the first direction with respect to the first movable body; a second driver configured to rotate the second movable body about an axis parallel to the first direction with respect to the first movable body; and a third driver configured to rotate the first movable body about an axis orthogonal to the first direction with respect to the carrier, wherein the third driver comprises a tilt guide ball disposed between the carrier and the first movable body and configured to provide a tilt center of the first movable body with respect to the carrier.

In a general aspect, a camera module includes a housing; an autofocus (AF) carrier disposed in the housing and configured to move in an optical axis direction; a tilting carrier disposed on the AF carrier, and configured to tilt relative to a fixed body with respect to an axis orthogonal to the optical axis; a movable body disposed on the tilting carrier; an image sensor coupled to the movable body; and a substrate, coupled to the tilting carrier and the movable body, and configured to deform based on a movement of the movable body with respect to the tilting carrier.

The substrate may include a movable portion on which the sensor is disposed; a fixed portion that is fixed to the tilting carrier; and a supporting portion that connects the movable portion to the fixed portion, wherein at least a portion of the supporting portion is configured to deform based on a movement between the movable portion and the tilting carrier.

The camera module may further include ball members disposed between the AF carrier and the housing, and configured to move the AF carrier in the optical axis direction.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
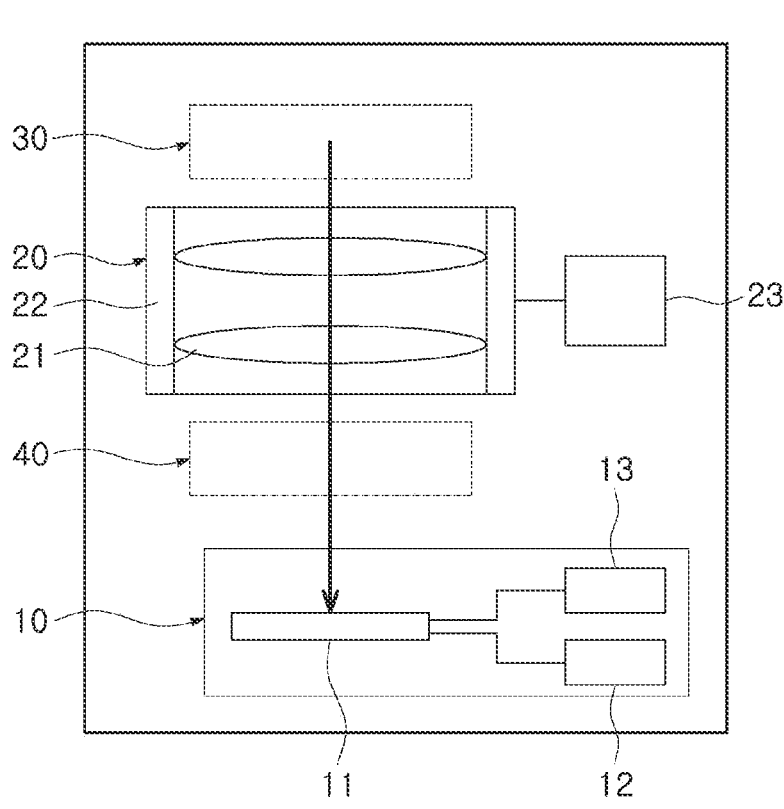
FIG. 1 illustrates components included in an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, same elements will be indicated by same reference numerals. Also, redundant descriptions and detailed descriptions of known functions and elements which may unnecessarily allow the gist of the present disclosure obscure will not be provided. In the accompanying drawings, some elements may be exaggerated, omitted or briefly illustrated, and the sizes of the elements do not necessarily reflect the actual sizes of these elements.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

An expression used in the singular encompasses the expression of the plural, unless it has a clearly different meaning in the context.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the example embodiments, the X-direction, the Y-direction, and the Z-direction may refer to a direction parallel to the X axis, a direction parallel to the Y axis, and a direction parallel to the Z axis, respectively, in the drawings. Additionally, unless otherwise indicated, the X-direction may include both the +X-axis direction and the −X-axis direction, which may also apply to the Y-direction and the Z-direction.

In the example embodiments, two directions (or axes) are parallel to or orthogonal to each other may also include the examples in which the two directions (or axes) are substantially parallel to or substantially side by side to each other. For example, the configuration in which the first axis and the second axis are orthogonal to each other may indicate that the first axis and the second axis may form an angle of 90 degrees or an angle of approximately 90 degrees.

"An example embodiment" does not necessarily indicate the same example embodiments. The particular features, structures, or characteristics may be combined in any suitable manner consistent with the example embodiments.

In the example embodiments, "configured to" may indicate that a component may include a structure necessary to implement a function.

One or more examples implement optical image stabilization by driving an image sensor.

One or more examples may enable a camera to provide an effective optical image stabilization function with low power, and to provide an automatic focusing function and an improved shaking correction function by driving an image sensor in various directions.

1. Camera Module

FIG. 1 illustrates example components included in a camera module 1, in accordance with one or more embodiments.

In an example embodiment, the camera module 1 may include a lens module 20 including at least one lens 21 and a lens barrel 22 accommodating at least one lens 21, and an image sensor 11. Light L may pass through the lens module 20 and may reach an imaging plane of the image sensor 11. The camera module 1 may include an AF driver 23 which may move the lens module 20 in an optical axis direction to adjust a focal length. The AF driver 23 may include, for example, a coil and a magnet opposing each other. The coil may be fixedly coupled to the lens module 20, the magnet may be coupled to a fixed body such as a housing, and electromagnetic interaction between the coil and the magnet may allow the lens module 20 to move in the optical axis direction.

In an example, the autofocusing may be implemented by driving the image sensor 11 instead of driving the lens module 20. For example, the second AF driver 13 may move the image sensor 11 in the optical axis direction. An example of the second AF driver 13 will be described with reference to FIGS. 9 and 10.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis, or to allow the image sensor 11 to rotate about an axis parallel to the optical axis or to rotate about an axis orthogonal to the optical axis.

In an example embodiment, the camera module 1 may include a sensor shifting module 10. The sensor shifting module 10 may include components necessary to implement the OIS function by driving the image sensor 11. For example, the sensor shifting module 10 may include an image sensor 11 and an OIS driver 12 that drives the image sensor 11. As another example, the sensor shifting module 10 may refer to only the OIS driver 12 excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 described with reference to FIGS. 2A to 8D may be applied to the camera module 1 illustrated in FIG. 1.

2. Sensor Shift

Figure 2A:
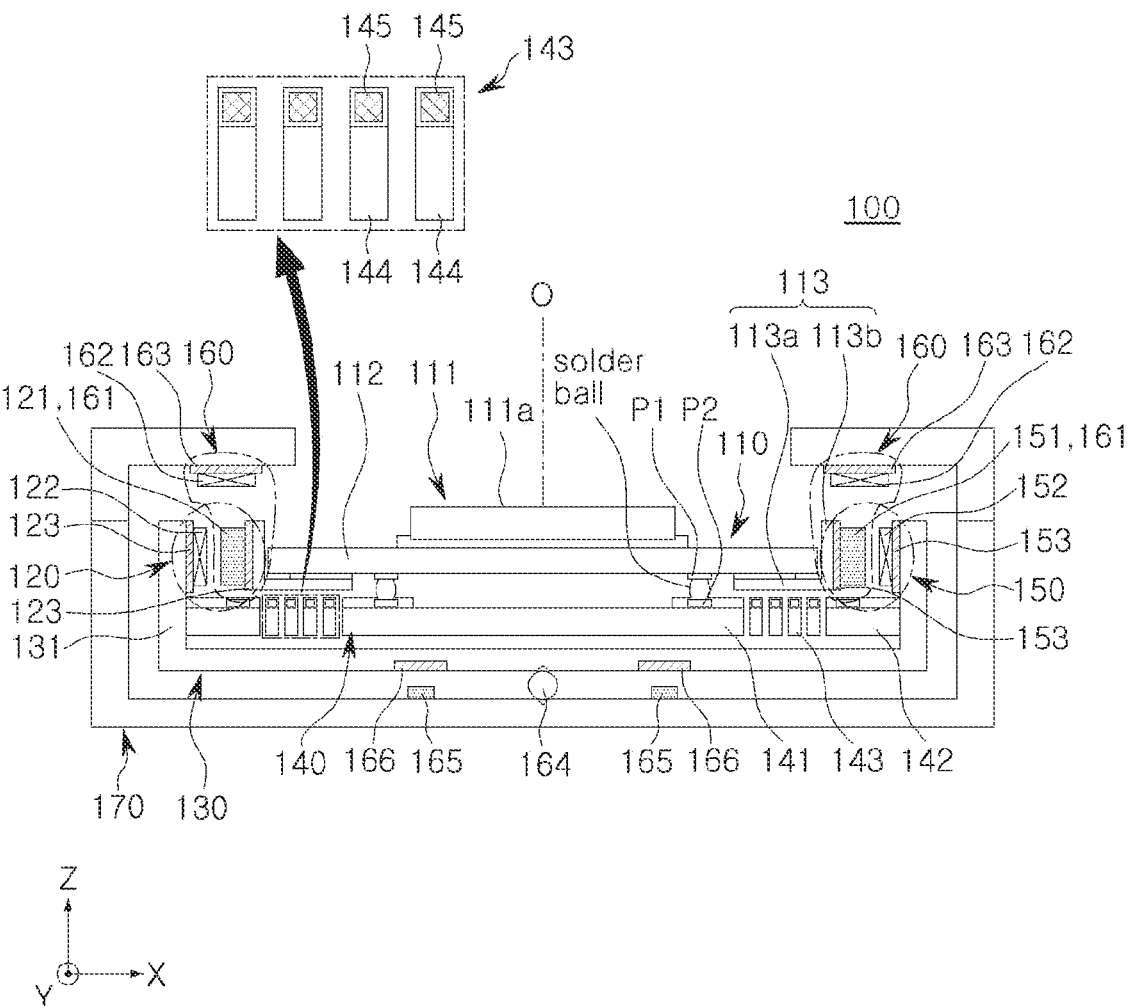
FIG. 2A illustrates an example sensor shifting module, in accordance with one or more embodiments.
Figure 2B:
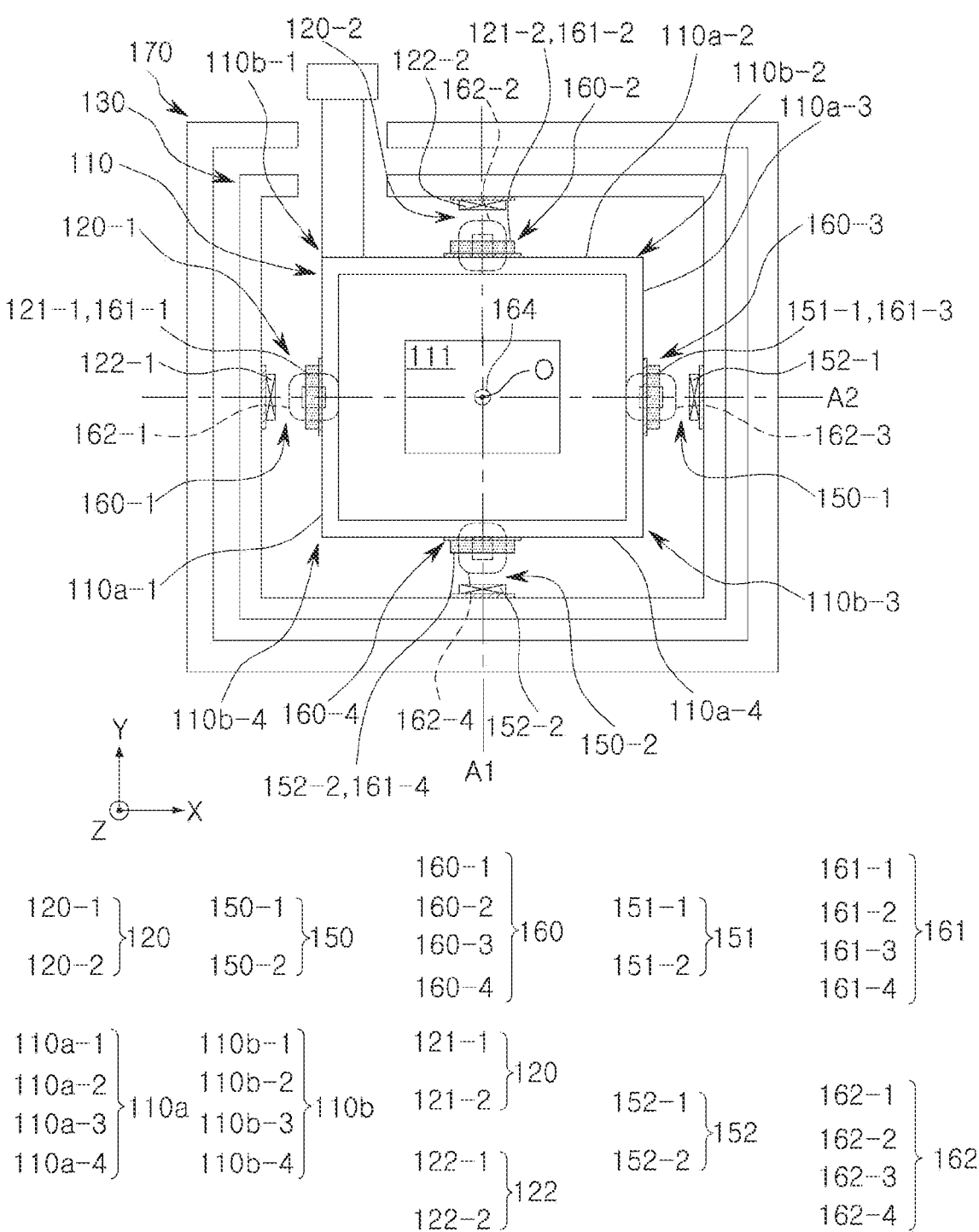
FIG. 2B illustrates actuators included in an OIS driving unit, in accordance with one or more embodiments.
Figure 2C:
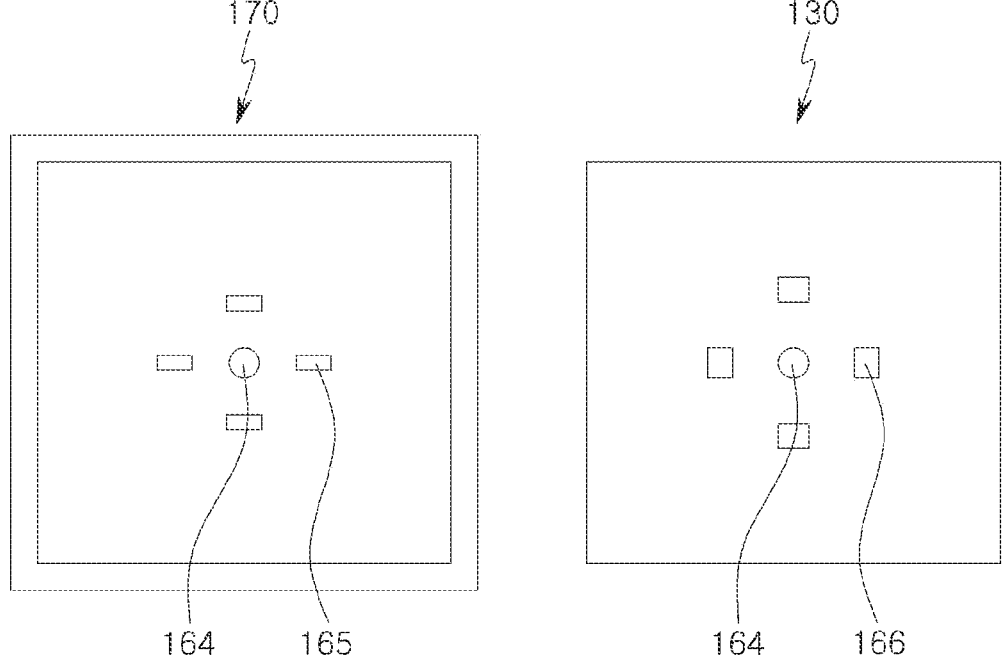
FIG. 2C illustrates a pulling device between a first movable body and a fixed body, in accordance with one or more embodiments.

FIG. 2A illustrates an example sensor shifting module 100, in accordance with one or more embodiments. FIG. 2B illustrates actuators included in an OIS driving unit, in accordance with one or more embodiments. FIG. 2C is a diagram illustrating a pulling device between a first movable body and a fixed body, in accordance with one or more embodiments.

The sensor shifting module 100 may include an OIS driver. The OIS driver may include at least one of a first OIS driver, a second OIS driver, and a third OIS driver, which will be described later. The first OIS driver may move the image sensor 111 in a direction orthogonal to the optical axis, the second OIS driver may rotate the image sensor 111 about an axis parallel to the optical axis, and the third OIS driver may rotate the image sensor 111 about an axis orthogonal to the optical axis.

The OIS driver 12 of the camera module 1 in FIG. 1 may include at least one of the first OIS driver, the second OIS driver, and the third OIS driver.

2.1. Translation+Rolling OIS 2.1.1. Structure

The sensor shifting module 100 may include a first OIS driver that drives the image sensor 111. In an example embodiment, the sensor shifting module 100 may include a second movable body 110 including an image sensor 111, and a first movable body 130 that carries the second movable body 110. The second movable body 110 may be movably disposed in the first movable body 130. The second movable body 110 may be configured to move together with the image sensor 111. For example, the second movable body

110 may include a sensor substrate 112 on which the image sensor 111 is mounted and a sensor holder 113 coupled to the sensor substrate 112. The second movable body 110 may move in a direction orthogonal to the optical axis with respect to the first movable body 130 by the first OIS driver.

Referring to FIG. 2A, the sensor holder 113 may include a plate 113a connected to the lower portion of the sensor substrate 112, and an extension portion 113b extending from the edge of the plate 113a to the upper portion (in the +Z-direction). The extension portion 113b may oppose the coils 122 and 153, and the magnets 121, 151, and 161 may be seated on the extension portion 113b.

A signal of the image sensor 111 may be transmitted to another electronic component (e.g., an image signal processor (ISP)) through the sensor substrate 112 and the connector.

The first movable body 130 may include a base 131 and components fixedly coupled to the base 131. For example, the first movable body 130 may include a driving magnet 121 of a first OIS driver and a driving magnet 151 of a second OIS driver, which will be described later.

In an example embodiment, the sensor shifting module 100 may include a first OIS driver that moves the image sensor 111 in a direction orthogonal to the optical axis O. The second movable body 110 may, through the first OIS driver, move in a direction orthogonal to a direction in which the imaging plane 111a of the image sensor 111 is directed with respect to the first movable body 130. In an example embodiment, the first OIS driver may correct the shaking of the camera module 1 or the electronic device on which the image sensor 111 is mounted in a direction orthogonal to the optical axis O. In an example embodiment, the first OIS driver may move the image sensor 111 in a first direction and a second direction orthogonal to the optical axis O. The first direction and the second direction may intersect each other. For example, the first OIS driver may move the second movable body 110 in the X-direction and/or the Y-direction orthogonal to the Z axis, thereby correcting the shaking in the X-direction and/or the Y-direction.

In the example embodiment, the direction in which the imaging plane 111a of the image sensor 111 is directed may be referred to as an optical axis O direction. That is, the second movable body 110 may move in a direction orthogonal to the optical axis O with respect to the first movable body 130. In the drawings, the optical axis O may be parallel to the Z axis, and accordingly, the Z-direction may refer to a direction parallel to the optical axis O. Additionally, the X-direction or the Y-direction may refer to a direction orthogonal to the optical axis O. For example, in the example embodiment, the configuration in which the second movable body 110 moves in the X-direction may indicate that the second movable body 110 may move in a direction orthogonal to the optical axis O. In another example, the configuration in which the driving yoke 121 and the driving coil 122 oppose each other in the X-direction may indicate that the driving yoke 121 and the driving coil 122 oppose each other in a direction orthogonal to the optical axis O. Additionally, the X-direction or the Y-direction may be an example of two directions orthogonal to the optical axis and intersecting each other, and in the example embodiment, the X-direction and the Y-direction may be configured as two directions orthogonal to the optical axis O and intersecting each other.

In an example embodiment, the sensor shifting module 100 may include a second OIS driver that rotates the image sensor 111 about an axis parallel to the optical axis O. The second movable body 110 may, through the second OIS driver, rotate with respect to the fixed body 170 about an axis parallel to the direction in which the imaging plane 111*a* of the image sensor 111 is directed. In an example embodiment, the second OIS driver may correct rotation of the camera module 1 or the electronic device on which the image sensor 111 is mounted about an axis parallel to the optical axis O.

2.1.2 First Actuator (Translation)

Referring to FIGS. 2A and 2B, in an example embodiment, the first OIS driver may include a first actuator 120 disposed between the first movable body 130 and the second movable body 110. In an example embodiment, the first actuator 120 may include a first driving magnet 121 coupled to the second movable body 110, and a first driving coil 122 coupled to the first movable body 130. For example, referring to FIG. 2A, in an example embodiment, the first driving coil 122 and the first driving magnet 121 may be coupled to the base 131 and the sensor holder 113, respectively. The first driving magnet 121 and the first driving coil 122 may oppose each other in a direction (e.g., the X-direction or the Y-direction) orthogonal to the optical axis O. Electromagnetic interaction between the first driving magnet 121 and the first driving coil 122 may allow the second movable body 110 to move in a direction orthogonal to the optical axis O with respect to the first movable body 130.

The first OIS driver may include a plurality of first actuators 120, and each of the first actuators 120 may include a first driving magnet 121 and a first driving coil 122. For example, the first OIS driver may include a 1-1 actuator 120-1 disposed on the first side surface 110*a*-1 of the second movable body 110 and a 1-2 actuator 120-2 disposed on the second side surfaces 110*a*-2 of the second movable body 110. Referring to FIG. 2B, a 1-1 actuator 120-1 may include a 1-1 driving magnet 121-1 and a 1-1 driving coil 122-1. The 1-2 actuator 120-2 may include a 1-2 driving magnet 121-2 and a 1-2 driving coil 122-2.

In an example embodiment, the first OIS driver may further include a yoke 123 disposed on one side of the first driving magnet 121 and/or the first driving coil 122. The yoke 123 attached to one side of the first driving coil 122 may allow the magnetic field created by the first driving coil 122 to be concentrated in a direction toward the first driving magnet 121. Since the yoke 123 is disposed on one side of the first driving coil 122, the magnetic field created by the first driving coil 122 may be prevented from affecting the other electronic components or the effect of the magnetic field on the other electronic components may be reduced. The yoke 123 attached to one side of the first driving magnet 121 may allow the magnetic field created by the first driving magnet 121 to be concentrated in a direction toward the first driving coil 122.

In the example embodiments, the first driving coil 122 and the first driving magnet 121 may be coupled to the first movable body 130 and the second movable body 110, respectively, but an example embodiment thereof is not limited thereto. In another example embodiment, the first driving coil 122 and the first driving magnet 121 may be coupled to the second movable body 110 and the first movable body 130, respectively. For example, the first driving coil 122 and the first driving magnet 121 may be coupled to the sensor holder 113 and the base 131, respectively.

2.1.3 Second Actuator (Rolling)

Referring to FIGS. 2A and 2B, in an example embodiment, the second OIS driver may include a second actuator 150 disposed between the first movable body 130 and the second movable body 110. In an example embodiment, the second actuator 150 may include a second driving magnet 151 coupled to the second movable body 110, and a second driving coil 152 coupled to the first movable body 130. For example, referring to FIG. 2A, in an example embodiment, the second driving coil 152 and the second driving magnet 151 may be coupled to the base 131 and the sensor holder 113, respectively. The second driving magnet 151 and the second driving coil 152 may oppose each other in a direction orthogonal to the optical axis O. Electromagnetic interaction between the second driving magnet 151 and the second driving coil 152 may rotate the second movable body 110 about an axis parallel to the optical axis O with respect to the first movable body 130.

The second OIS driver may include a plurality of second actuators 150, and each of the second actuators 150 may include a second driving magnet 151 and a second driving coil 152. For example, the second OIS driver may include a 2-1 actuator 150-1 disposed on the third side surface 110-3 of the second movable body 110 and a 2-2 actuator 150-2 disposed on the fourth side surface 110-4 of the second movable body 110. Referring to FIG. 2B, the 2-1 actuator 150-1 may include a 2-1 driving magnet 151-1 and a 2-1 driving coil 152-1. The 2-2 actuator 150-2 may include a 2-2 driving magnet 151-2 and a 2-2 driving coil 152-2.

In an example embodiment, the second OIS driver may further include a yoke 153 disposed on one side of the second driving magnet 151 and/or the second driving coil 152. The yoke 153 attached to one side of the second driving coil 152 may allow the magnetic field created by the second driving coil 152 to be concentrated in a direction toward the second driving magnet 151. Since the yoke 153 is disposed on one side of the second driving coil 152, the magnetic field created by the second driving coil 152 may be prevented from affecting the other electronic components or the effect of the magnetic field on the other electronic components may be reduced. The yoke 153 attached to one side of the second driving magnet 151 may allow the magnetic field created by the second driving magnet 151 to be concentrated in a direction toward the second driving coil 152.

In the example embodiment, the second driving coil 152 and the second driving magnet 151 may be coupled to the first movable body 130 and the second movable body 110, respectively, but an example embodiment thereof is not limited thereto. In another example embodiment, the second driving coil 152 and the second driving magnet 151 may be coupled to the second movable body 110 and the first movable body 130, respectively. For example, the second driving coil 152 and the second driving magnet 151 may be coupled to the sensor holder 113 and the base 131, respectively.

2.1.4. PCB Spring

In an example embodiment, the sensor shifting module 100 may include a substrate 140 mechanically connecting the second movable body 110 to the first movable body 130. The substrate 140 may couple the second movable body 110 to the first movable body 130 such that the second movable body 110 may move on a plane orthogonal to the optical axis with respect to the first movable body 130. A portion of the substrate 140 may be deformed according to the movement of the second movable body 110 with respect to the first movable body 130. That is, a portion of the substrate 140 may be flexible. When the substrate 140 is deformed, restoring force may be created in the substrate 140, and the restoring force may allow the second movable body 110 to return to the original position. The second movable body 110 in the equilibrium state may move with respect to the first movable body 130 as a current is applied to the first driving coil 122 or the second driving coil 152, and when no current flows through the first driving coil 122 and the second driving coil 152, the second movable body 110 may return to the original position by the substrate 140.

Figure 3:
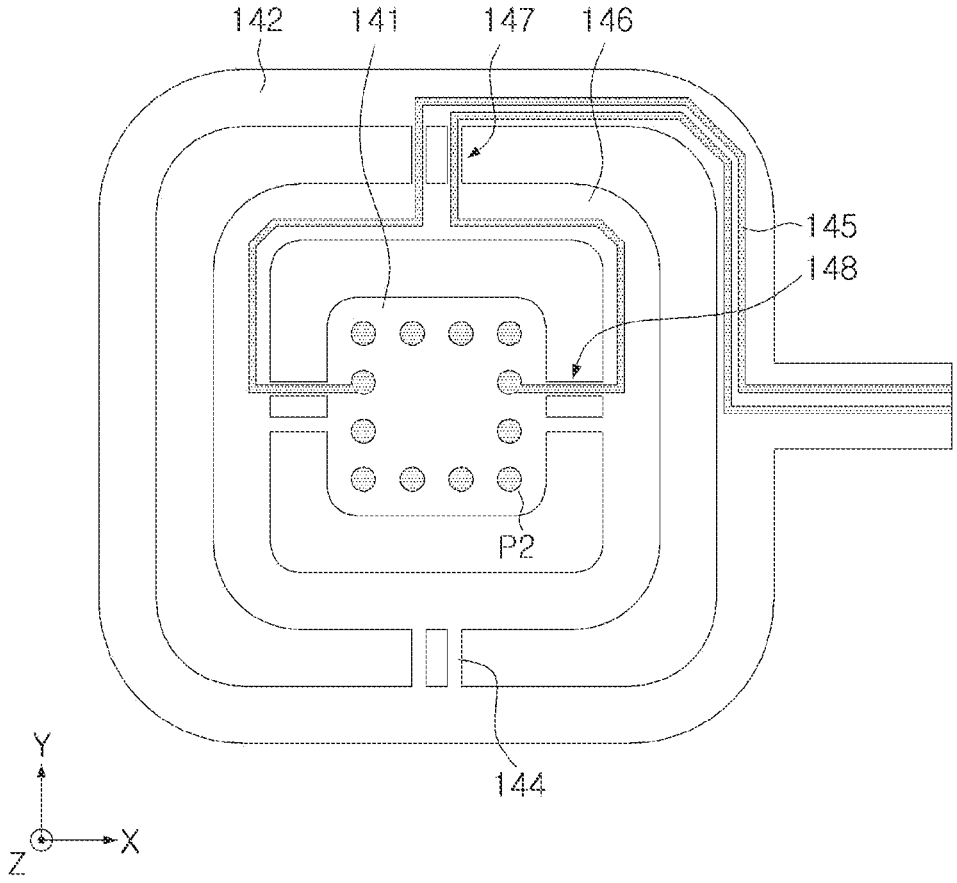
FIG. 3 illustrates a substrate on which an example image sensor is mounted when viewed from above, in accordance with one or more embodiments.

FIG. 3 illustrates a substrate on which an image sensor is mounted according to an example embodiment, viewed from above. Referring to FIGS. 2A to 2C and 3, the substrate 140 may include a movable portion 141 (a floating portion) on which the sensor substrate 112 is seated, and a fixed portion 142 fixed to the first movable body 130). The sensor substrate 112 and the movable portion 141 may be electrically connected to each other through solder balls at corresponding contact points P1 and P2.

While the second movable body 110 (or the image sensor 111) moves relative to the first movable body 130, the movable portion 141 may move relative to the fixed portion 142. The substrate 140 may include a supporting portion 143 connecting the movable portion 141 to the fixed portion 142. At least a portion of the supporting portion 143 may be deformed according to the relative movement between the movable portion 141 and the first movable body 130. For example, the supporting portion 143 may be configured as a flexible substrate. The flexible substrate may be provided in a form in which a conductive pattern (or an electrical trace 145) is formed in a film formed of a polyimide material.

In an example embodiment, the substrate 140 may include a plurality of bridge elements 144 connecting the movable portion 141 to the fixed portion 142. The plurality of bridge elements 144 may be included in at least a portion of the supporting portion 143. The plurality of bridge elements 144 may be formed of a flexible material, such that the plurality of bridge elements 144 may be deformed when the movable portion 141 moves relative to the fixed portion 142. When the second movable body 110 moves relative to the first movable body 130, the movable portion 141 may move relative to the fixed portion 142, and the bridge elements 144 may be deformed. Restoring force created as the bridge elements 144 are deformed may allow the second movable body 110 or the movable portion 141 to return to the original position. Each of the plurality of bridge elements 144 may embed at least one electrical wiring 145 therein. That is, the plurality of bridge elements 144 may mechanically and electrically connect the movable portion 141 (or the second movable body 110) to the fixed portion 142 (or the first movable body 130). That is, the bridge elements 144 may support the image sensor 111 and may function as a passage through which a signal of the image sensor 111 is transmitted.

In an example embodiment, the substrate 140 may include a guide 146 disposed between the movable portion 141 and the fixed portion 142. For example, the guide 146 may be provided in the form of a picture frame surrounding the movable portion 141. The fixed portion 142, the guide 146, and the movable portion 141 may be connected to each other via the bridge elements 144. For example, the substrate 140 may include a first bridge 147 extending from the movable portion 141 to the guide 146 and a second bridge 148 extending from the guide 146 to the fixed portion 142. The first bridge 147 and the second bridge 148 may extend in a direction orthogonal to the optical axis. The first bridge 147 and the second bridge 148 may extend in a direction intersecting each other. For example, the first bridge 147 may extend in the Y-direction, and the second bridge 148 may extend in the Z-direction.

Each of the first bridge 147 and the second bridge 148 may include one or more bridge elements 144. In FIG. 3, the first bridge 147 may include four bridge elements 144 extending in the X-direction, and the second bridge 148 may include four bridge elements 144 extending in the Y-direction. The substrate 140 in FIG. 3 may be an example, and the form of the supporting portion 143 connecting the movable portion 141 to the fixed portion 142 may be varied. For example, the supporting portion 143 may include a plurality of bridge elements 144 extending directly from the movable portion 141 to the fixed portion 142. As another example, the first bridge 147 or the second bridge 148 may include five bridge elements 144. The number of bridge elements 144 included in the first bridge 147 or the second bridge 148 may correspond to the number corresponding to the terminals of the image sensor 111.

The substrate 140 may include an electrical wiring 145 that transmits a signal of the image sensor 111. A plurality of bridge elements 144 included in the supporting portion 143 may embed the electrical wiring 145 therein. The image sensor 111 may be mounted on the sensor substrate 112, and the sensor substrate 112 may be electrically connected to the fixed portion 142 of the substrate 140. An electrical wiring 145 may extend from each of the contact points P2 formed in the movable portion 141. The electrical wiring 145 may extend to the fixed portion 142 through the bridge element 144. The electrical wiring 145 extending to the fixed portion 144 may be electrically connected to another substrate or electronic component.

FIG. 3 illustrates the electrical wiring 145 formed on the substrate 140, and only the electrical wiring 145 extending from a portion of the contact points is illustrated for ease of description.

In an example embodiment, the first OIS driver may include a first position sensor which may measure how much the second movable body 110 moves in a direction orthogonal to the optical axis O. The first position sensor may be configured, as only examples, as a Hall sensor or a magnetoresistive sensor. In an example embodiment, the first position sensor may be disposed in the first driving coil 122 to oppose the first driving magnet 121. The internal portion of the coil may refer to an empty space corresponding to the winding center of the coil. In another example embodiment, the first OIS driver may include a sensing magnet distinct from the first driving magnet 121, and the first position sensor may be disposed to oppose the sensing magnet. For example, the first position sensor and the sensing magnet may be disposed to oppose the base 131 or the substrate 140 in the optical axis direction (in the Z-direction).

In an example embodiment, the first OIS driver may include a second position sensor which may measure how much the second movable body 110 rotates along an axis parallel to the optical axis O. The second position sensor may be configured as a Hall sensor or a magnetoresistance sensor. In an example embodiment, the second position sensor may be disposed in the second driving coil 152 to oppose the second driving magnet 151. In another example embodiment, the second OIS driver may include a sensing magnet distinct from the second driving magnet 151, and the second position sensor may be disposed to oppose the sensing magnet. For example, the second position sensor and the sensing magnet may be disposed to oppose the base 131 or the substrate 140 in the optical axis direction (in the Z-direction).

The second position sensor may be the same component as the first position sensor. That is, one position sensor may be used to measure both translational movement (movement by the first OIS driver) and rotational movement (movement by the second OIS driver) of the second movable body.

2.1.4. Arrangement of Actuator

Figure 4A:
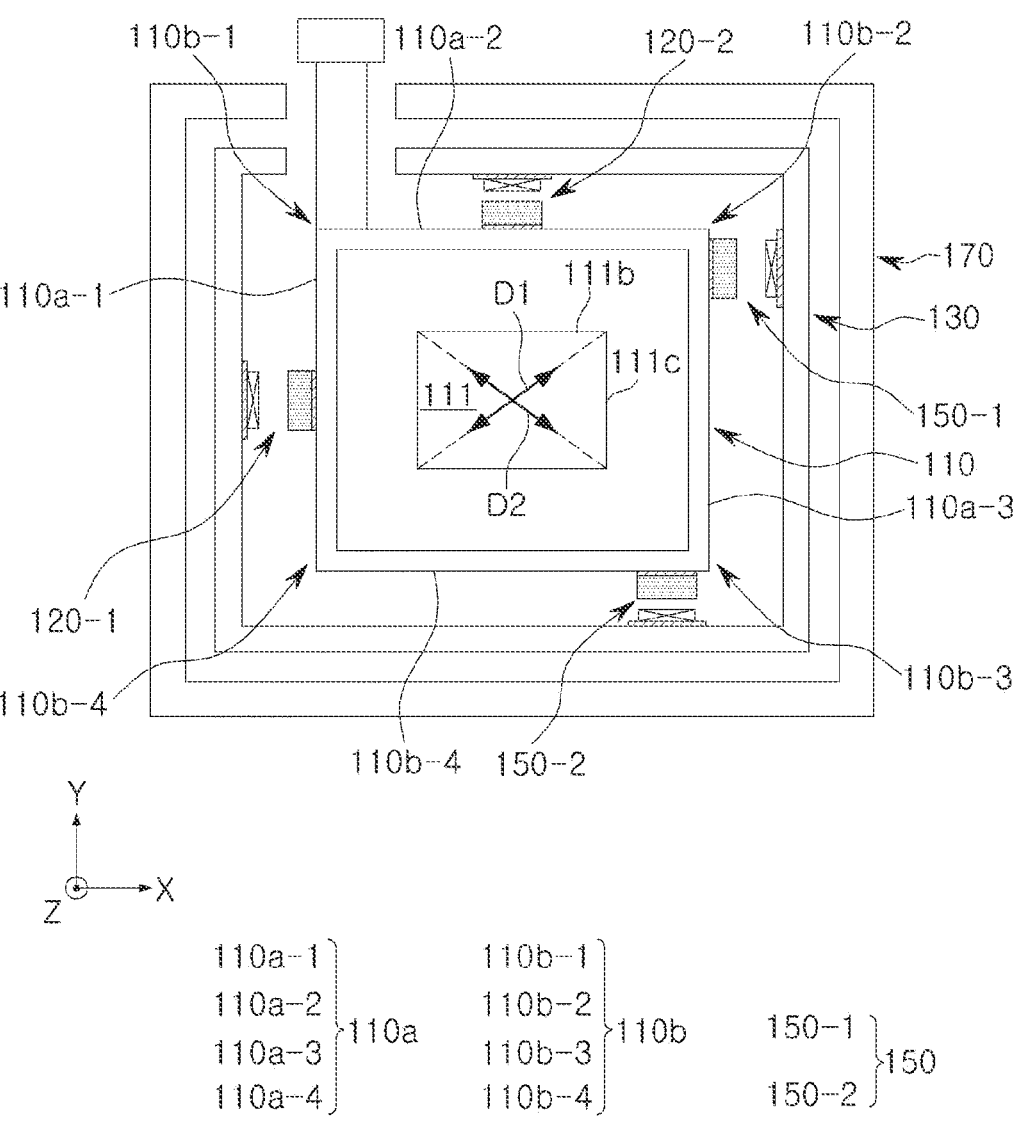
FIG. 4A and FIG. 4B illustrate arrangements of a first OIS driver and a second OIS driver, in accordance with one or more embodiments.
Figure 4B:
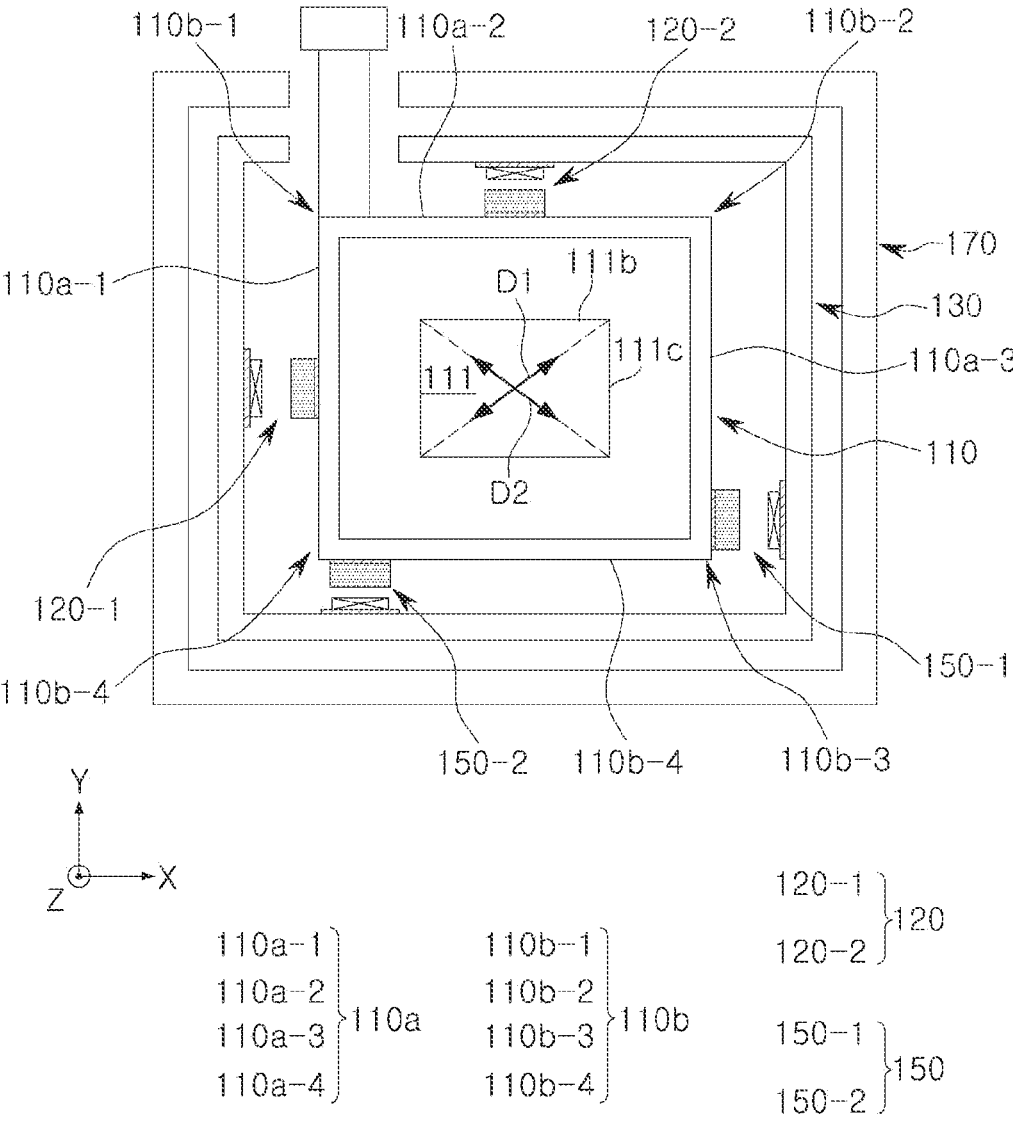

FIGS. 4A and 4B illustrate arrangements of a first OIS driver and a second OIS driver, in accordance with one or more embodiments.

Referring to FIG. 2B, FIG. 4A, or FIG. 4B, the second movable body 110 may include four side surfaces 110a-1, 110a-2, 110a-3, and 110a-4 which form a quadrangular shape, and two side surfaces adjacent to each other among the four side surfaces 110a-1, 110a-2, 110a-3, and 110a-4 may form a corner.

The second movable body 110 may include a first side surface 110a-1, a second side surface 110a-2, a third side surface 110a-3, and a fourth side surface 110a-4 in a clockwise direction. A first corner 110b-1 may be formed at the boundary between the first side surface 110a-1 and the second side surface 110a-2, a second corner 110b-2 may be formed at the boundary between the second side surface 110a-2 and the third side surface 110a-3, a third corner 110b-2 may be formed between the third side surface 110a-3 and the fourth side surface 110a-4, and a fourth corner 110b-4 may be formed between the fourth side surface 110a-4 and the first side surface 110a-1. The side surface 110a of the first movable body 110 may be a side surface of the sensor holder 113.

In an example embodiment, the four side surfaces 110a-1, 110a-2, 110a-3, 110a-4 may be parallel to the horizontal side 111b or the vertical side 111c of the image sensor 111, and the four corners 110b may be disposed in the diagonal directions D1 and D2 of the image sensor.

The first actuator 120 and the second actuator 150 may be disposed on side surfaces distinct from each other among the four side surfaces 110a-1, 110a-2, 110a-3, and 110a-4. For example, the 1-1 actuator 120-1, the 1-2 actuator 120-2, the 2-1 actuator 150-1, and the 2-2 actuator 150-2 may be disposed on the first side surface 110a-1, the second side surface 110a-2, the third side surface 110a-3, and the fourth side surface 110a-4, respectively.

Referring to FIGS. 4A and 4B, the second actuator 150 included in the second OIS driver may be disposed adjacent to the corner 110b of the second movable body 110. Since the second actuator 150 is disposed adjacent to the corner 110b, the second movable body 110 may rotate efficiently.

Referring to FIG. 4A, the 1-1 actuator 120-1 and the 1-2 actuator 120-2 included in the first OIS driver may be disposed, as examples, in the center of a first side surface 110-1 and a second side surface 110-2. The 2-1 actuator 150-1 and the 2-2 actuator 150-2 included in the second OIS driver may be disposed, as examples, on the third side surface 110-3 and the fourth side surface 110-4, respectively. The 2-1 actuator 150-1 and the 2-2 actuator 150-2 may be disposed adjacent to the second corner 110b-2 and the third corner 110b-3, respectively.

Referring to FIG. 4B, the 2-1 actuator 150-1 and the 2-2 actuator 150-2 included in the second OIS driver may be disposed on a third side surface 110-3 and a fourth side surface 110-4, respectively. The 2-1 actuator 150-1 and the 2-2 actuator 150-2 may be disposed adjacent to the third corner 110b-3 and the fourth corner 110b-4, respectively.

2.2. Tilting OIS
2.2.1. Structure

Referring to FIG. 2A, the sensor shifting module 100 may include a third OIS driver 160. The sensor shifting module 100 may include a third OIS driver that moves the first movable body 130 relative to the fixed body 170. The third OIS driver may rotate the first movable body 130 about an axis (e.g., the first axis A1 or the second axis A2 in FIG. 2B) orthogonal to the optical axis O with respect to the fixed body 170. The shaking correction may be implemented by translating the image sensor 111 in a direction orthogonal to the optical axis O. However, since the size of the mobile camera is relatively small, the range of translation movement may be relatively small, and accordingly, when the degree of shaking is relatively large, the amount of correction may not reach the shaking. The third OIS driver may correct the shaking by tilting the image sensor 111, and may provide a shaking correction function of excellent quality even for relatively large shaking.

The first movable body 130 may be movably disposed in the fixed body 170. The first movable body 130 may move with respect to the fixed body 170 by the third OIS driver. The image sensor 111 may be coupled to the first movable body 130. The image sensor 111 may be movably coupled to the first movable body 130. For example, the image sensor 111 may be coupled to the second movable body 110, and the second movable body 110 may be movably coupled to the first movable body 130. The second movable body 110 may move relative to the first movable body 130 by the first OIS driver or the second OIS driver.

2.2.2. Third Actuator (Tilting)

Referring to FIGS. 2A and 2B, the third OIS driver may include a third actuator 160 disposed between the fixed body 170 and the first movable body 130. The third actuator 160 may include a third driving magnet 161 coupled to the first movable body 130 or the second movable body 110, and a third driving coil 162 coupled to the fixed body 170 to oppose the third driving magnet 161.

In an example embodiment, the third actuator 160 may further include a yoke 163. The yoke 163 may be disposed on one side of the third driving magnet 161 and/or the third driving coil 162.

In an example embodiment, the third driving magnet 161 may be the first driving magnet 121 of the first OIS driver or the second driving magnet 151 of the second OIS driver. That is, the first driving magnet 121 or the second driving magnet 151 may be included in a portion of the third OIS driver. For example, at least one of the 1-1 driving magnet 121-1, the 1-2 driving magnet 121-2, the 2-1 driving magnet 151-1, or the 2-2 driving magnet 151-2 may function as the third driving magnet 161. Accordingly, a component described as the third driving magnet 161 in the example embodiment may be understood as the first driving magnet 121 or the second driving magnet 151.

The third OIS driver may include a plurality of third actuators 160, and each of the third actuators 160 may include a third driving magnet 161 and a third driving coil 162. For example, the third OIS driver may include four third actuators 160 corresponding to the 1-1 actuator 120-1, the 1-2 actuator 120-2, the 2-1 actuator 150-1, and the 2-2 actuator 150-2, respectively.

In an example embodiment, the third actuator 160 may include a 3-1 actuator 160-1, a 3-2 actuator 160-2, a 3-3 actuator 160-3, and a 3-4 actuator 160-4.

Referring to FIG. 2B, a 3-1 actuator 160-1 may include a 3-1 driving magnet 161-1 and a 3-1 driving coil 162-1. The 3-2 actuator 160-2 may include a 3-2 driving magnet 161-2 and a 3-2 driving coil 162-2. The 3-3 actuator 160-3 may include a 3-3 driving magnet 161-3 and a 3-3 driving coil 162-3. The 3-4 actuator 160-4 may include a 3-4 driving magnet 161-4 and a 3-4 driving coil 162-4.

The 1-1 driving magnet 121-1, the 1-2 driving magnet 121-2, the 2-1 driving magnet 151-1, and the 2-2 driving magnet 151-2 may function as driving magnets 161-1, 161-2, 161-3, and 161-4 of the 3-1 actuator 160-1, the 3-2 actuator 160-2, the 3-3 actuator 160-3, and the 3-4 actuator 160-4, respectively. The 3-1 driving coil 162-1, the 3-2 driving coil 162-2, the 3-3 driving coil 162-3, and the 3-4 driving coil 162-4 may be disposed to oppose the 1-1 driving magnet 121-1, the 1-2 driving magnet 121-2, the 2-1 driving magnet 151-1, and the 2-2 driving magnet 151-2, respectively.

Referring to FIG. 2B, the third OIS driver may rotate the first movable body 130 about the first axis A1 and the second axis A2. The first axis A1 and the second axis A2 may be orthogonal to the optical axis and may intersect each other. For example, the first axis A1 may be parallel to the Y axis and the second axis A2 may be parallel to the X axis.

The 3-1 actuator 160-1 or the 3-3 actuator 160-3 may provide a moment to the first movable body 130 in the first axis A1 direction. When a current is applied to the 3-1 driving coil 162-1, an attractive force or a repulsive force may be created between the 3-1 driving coil 162-1 and the 1-1 driving magnet 121-1, such that the first movable body 130 may be tilted relative to the fixed body 170 with respect to the first axis A1 orthogonal to the optical axis. When a current is applied to the 3-3 driving coil 162-3, attractive force or repulsive force may be created between the 3-3 driving coil 162-3 and the 2-1 driving magnet 151-1, such that the first movable body 130 may be tilted relative to the fixed body 170 with respect to the first axis A1 orthogonal to the optical axis.

The 3-2 actuator 160-2 and the 3-4 actuator 160-4 may provide a moment to the first movable body 130 in the second axis A2 direction. When a current is applied to the 3-2 driving coil 162-2, an attractive force or a repulsive force may be created between the 3-2 driving coil 162-2 and the 1-2 driving magnet 121-2, such that the first movable body 130 may be tilted relative to the fixed body 170 with respect to the second axis A2 orthogonal to the optical axis. When a current is applied to the 3-4 driving coil 162-4, attractive force or repulsive force may be created between the 3-4 driving coil 162-4 and the 2-2 driving magnet 151-2, such that the first movable body 130 may be tilted relative to the fixed body 170 with respect to the second axis A2 orthogonal to the optical axis.

In an example embodiment, a portion of the 3-1 driving coil 162-1, the 3-2 driving coil 162-2, the 3-3 driving coil 162-3, or the 3-4 driving coil 162-4 may not be provided. In an example embodiment, one of the 3-1 actuator 160-1 and the 3-3 actuator 160-3 providing the moment in the Y-direction may not be provided. In an example embodiment, one of the 3-2 actuator 160-2 and the 3-4 actuator 160-4 providing the moment in the X-direction may not be provided. For example, the third OIS driver may include only the 3-1 actuator 160-1 and the 3-2 actuator 160-2. As another example, the third OIS driver may include only the 3-3 actuator 160-3 and the 3-4 actuator 160-4.

Meanwhile, in examples, the first driving magnet 121 and the second driving magnet 151 included in a portion of the respective first OIS driver and the second OIS driver may be coupled to the first movable body 130, or may alternately be coupled to the second movable body 110. In this example, the third driving coil 162 may be disposed to oppose the first driving magnet 121 and the second driving magnet 151 coupled to the second movable body 110.

2.2.3. Ball Guide

In an example embodiment, the third OIS driver may include a tilt guide ball 164 disposed between the fixed body 170 and the first movable body 130. The tilt guide ball 164 may provide a tilt center for the fixed body 170 of the first movable body 130. For example, the first movable body 130 may be tilted around the tilt guide ball 164. The lower surface of the first movable body 130 and the bottom surface of the fixed body 170 may oppose each other in the optical axis O direction, and a groove that accommodates at least a portion of the tilt guide ball 164 may be formed in the lower surface of the first movable body 130 and the bottom surface of the fixed body 170, respectively.

2.2.4. Pulling

FIG. 2C illustrates the upper surface of the fixed body and the lower surface of the first movable body in an example embodiment.

Referring to FIGS. 2A and 2C, in an example embodiment, the third OIS driver may include a pulling device disposed on the fixed body 170 and the first movable body 130, respectively, and opposing each other in a direction parallel to the optical axis O. The pulling device may include a first magnetic member 165 and a second magnetic member 166. A magnetic attraction may be created between the first magnetic member 165 and the second magnetic member 166, such that the first movable body 130 may be pulled toward the bottom surface of the fixed body 170. Accordingly, the tilt guide ball 164 may be maintained to be in contact with the first movable body 130 and the fixed body 170 based on the interaction of the first magnetic member 165 and the second magnetic member 166, such that the first movable body 130 may be smoothly tilted with respect to the fixed body 170.

In an example, one of the first magnetic member 165 or the second magnetic member 166 may be a magnet, and the other may be a magnet or a yoke. As a non-limiting example, the first magnetic member 165 may be a magnet and the second magnetic member 166 may be a yoke.

Referring to FIG. 2C, a plurality of first magnetic members 165 and a plurality of second magnetic members 166 corresponding to the plurality of first magnetic members 165 may be arranged around the tilt guide ball 164.

In an example embodiment, the third OIS driver may include a third position sensor configured to measure the amount of tilting of the first movable body 130. As only examples, the third position sensor may be configured as a Hall sensor or a magnetoresistance sensor.

In an example embodiment, the third position sensor may be disposed in the third driving coil 162 and may oppose the first driving magnet 121 or the second driving magnet 151.

In an example embodiment, the third OIS driver may include a sensing magnet opposing the third position sensor. In an example embodiment, one of the first magnetic member 165 and the second magnetic member 166 may be a magnet and the other may be a yoke, and the magnetic member which is a magnet may function as a sensing magnet. For example, referring to FIG. 2A, the first magnetic member 165 may be a magnet, the second magnetic member 166 may be a yoke, the second magnetic member 165 may include a through portion therein, and a third position sensor may be disposed in the through portion.

2.3. Movement 2.3.1. Translation Movement

FIGS. 5A to 5D illustrate the movement of a second movable body based on a first OIS driver.

Figure 5A:
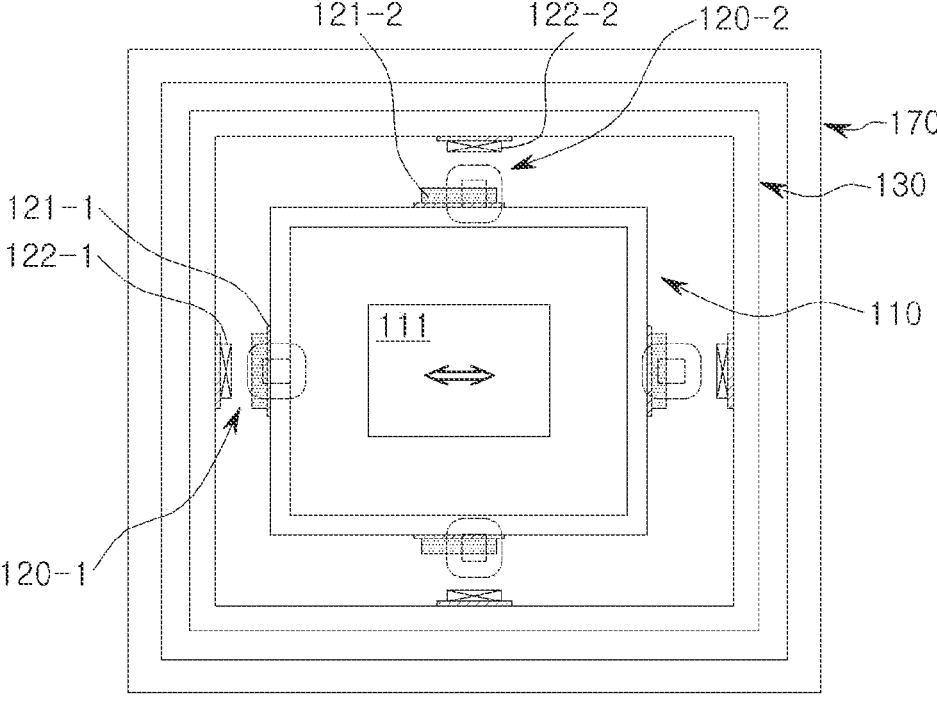
FIG. 5A and FIG. 5B illustrate movement of a second movable body due to a first OIS driver, in accordance with one or more embodiments.
Figure 5A:
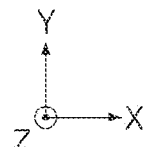

Referring to FIG. 5A, the 1-1 actuator 120-1 may move the second movable body 110 in the X-direction with respect to the first movable body 130. When a current is applied to the 1-1 driving coil 122-1, attractive force or repulsive force in the X-direction may be created between the 1-1 driving coil 122-1 and the 1-1 driving magnet 121-1 such that the second movable body 110 (or the image sensor 111) may move in the −X-direction or the +X-direction.

Figure 5B:
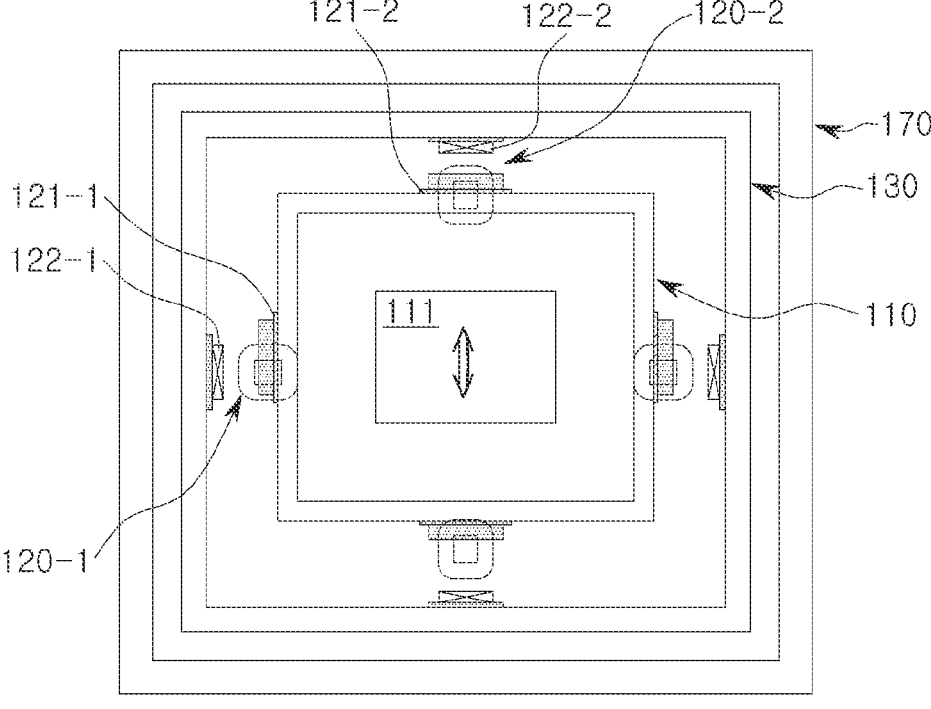
Figure 5B:
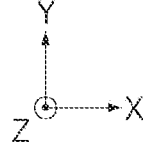

Referring to FIG. 5B, the first and second actuators 120-1 and 120-2 may move the second movable body 110 in the Y-direction with respect to the first movable body 130. When a current is applied to the 1-2 driving coil 122-2, attractive force or repulsive force in the Y-direction may be created between the 1-2 driving coil 122-2 and the 1-2 driving magnet 121-2, such that the second movable body 110 (or the image sensor 111) may move in the −Y-direction or the +Y-direction.

2.3.2. Rolling Movement

Figure 6A:
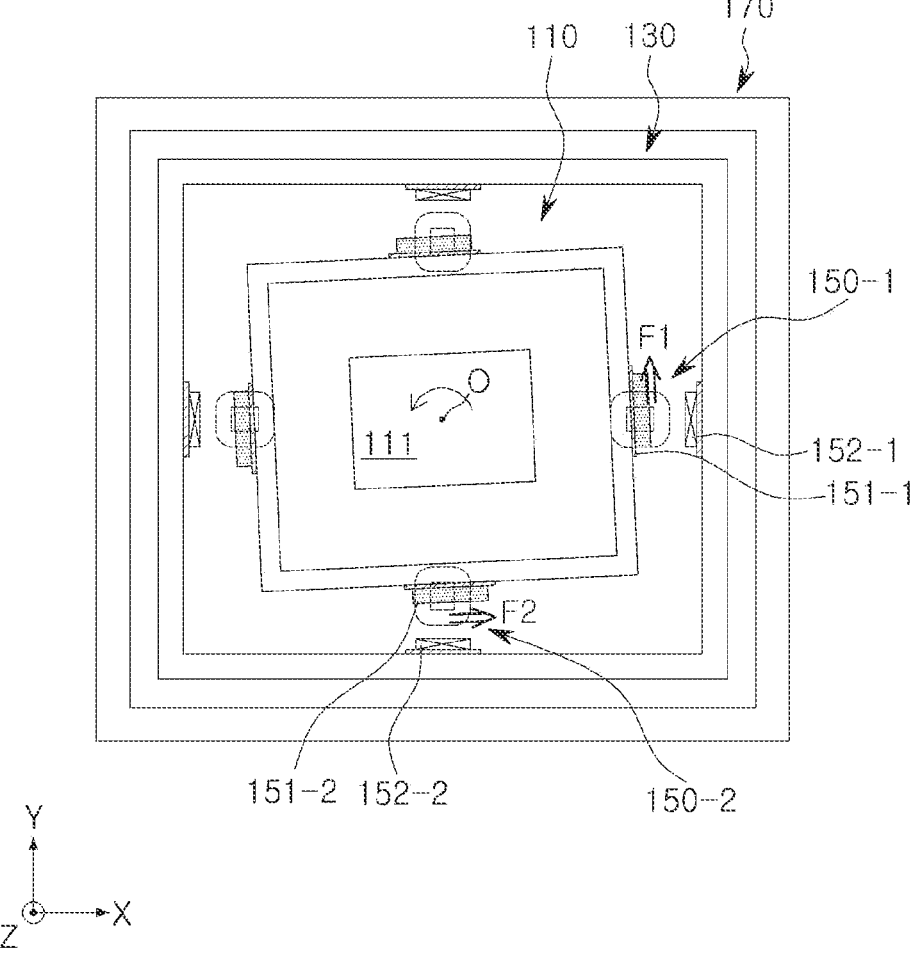
FIG. 6A and FIG. 6B illustrate the rolling of a second movable body due to a second OIS driver, in accordance with one or more embodiments.
Figure 6B:
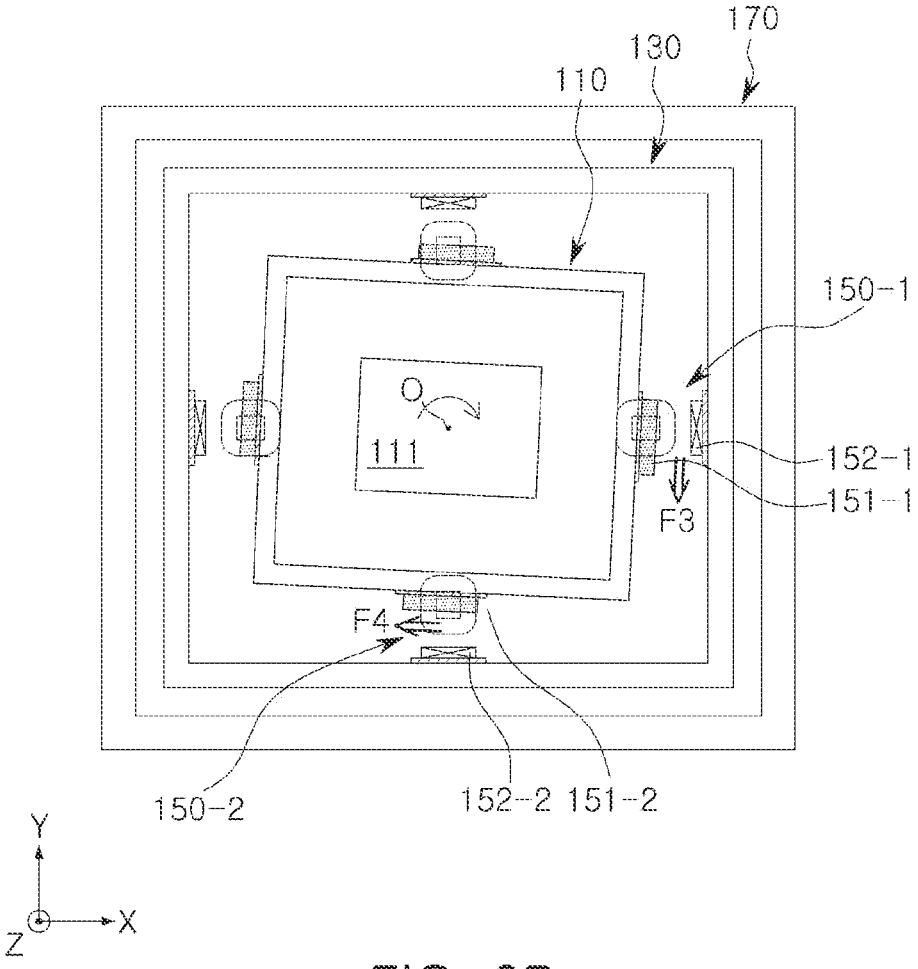

FIGS. 6A and 6B illustrate the rolling of a second movable body 110 based on a second OIS driver.

Referring to FIG. 6A, the 2-1 actuator 150-1 and the 2-2 actuator 150-2 may rotate the second movable body 110 in a counterclockwise direction with respect to the first movable body 130. The 2-1 actuator 150-1 and the 2-2 actuator 150-2 may provide a moment to the second movable body 110 in a counterclockwise direction. For example, a Lorentz force may be created between the 2-1 driving magnet 151-1 and the 2-1 driving coil 152-1, and accordingly, a force F1 may act on the 2-1 driving magnet 151-1. A Lorentz force may be created between the 2-2 driving magnet 151-2 and the 2-2 driving coil 152-2, and accordingly, a force F2 may act on the 2-1 driving magnet 151-1. F1 and F2 may rotate the second movable body 110 in a counterclockwise direction.

Referring to FIG. 6A, the 2-1 actuator 150-1 and the 2-2 actuator 150-2 may rotate the second movable body 110 in a clockwise direction with respect to the first movable body 130. The 2-1 actuator 150-1 and the 2-2 actuator 150-2 may provide a moment in a clockwise direction to the second movable body 110. For example, a Lorentz force may be created between the 2-1 driving magnet 151-1 and the 2-1 driving coil 152-1, and accordingly, a force F3 may act on the 2-1 driving magnet 151-1. A Lorentz force may be created between the 2-2 driving magnet 151-2 and the 2-2 driving coil 152-2, and accordingly, a force F4 may act on the 2-1 driving magnet 151-1. F3 and F4 may rotate the second movable body 110 in a clockwise direction.

2.3.3. Tilting Movement

Figure 7A:
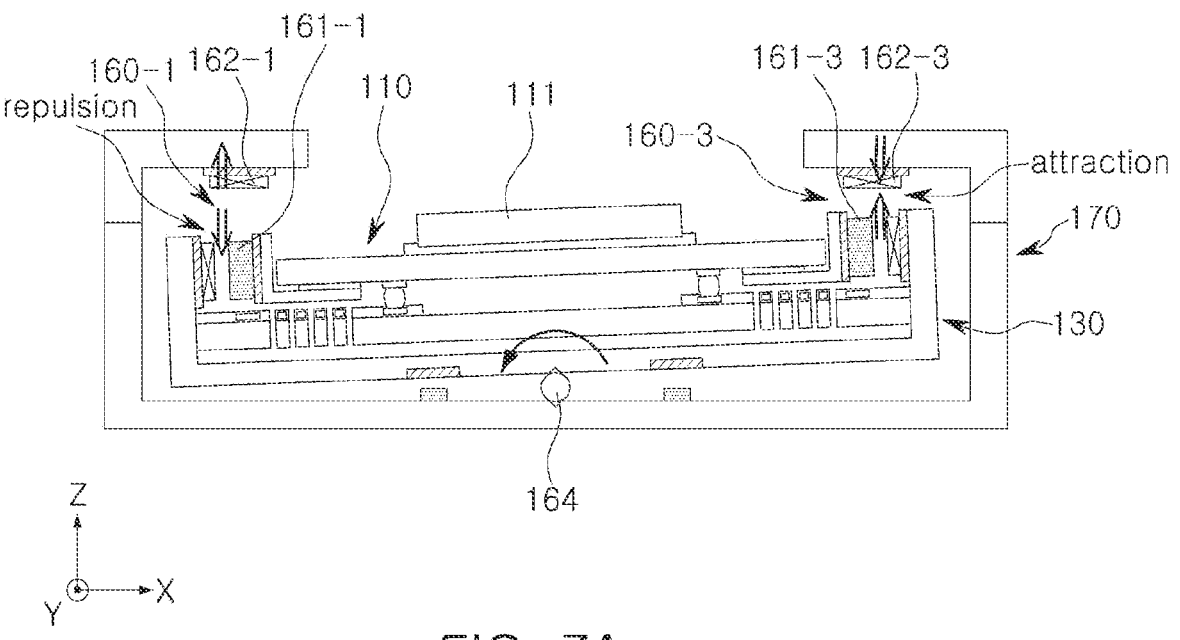
FIG. 7A and FIG. 7B illustrate the tilting of a first movable body due to a third OIS driver, in accordance with one or more embodiments.
Figure 7B:
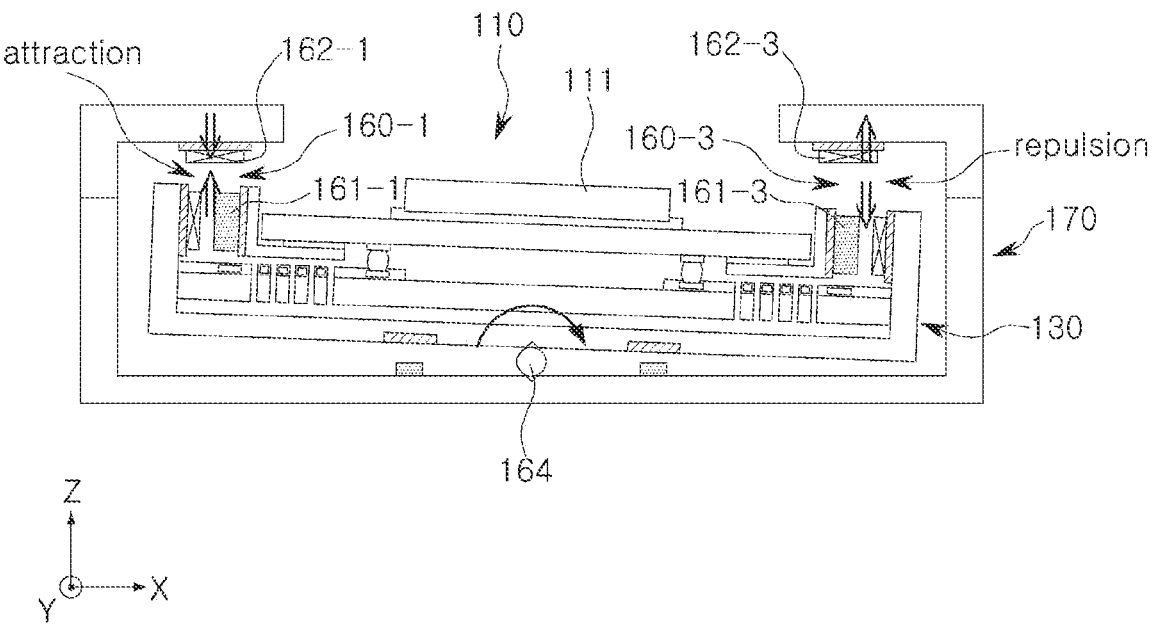

FIGS. 7A and 7B illustrate the tilting of the first movable body or tilting carrier 130.

Referring to FIGS. 7A and 7B, the third OIS driver may rotate the image sensor about an axis orthogonal to the optical axis. For example, the third OIS driver may rotate the first movable body 130 or the second movable body 110 in a clockwise or counterclockwise direction with respect to the tilt guide ball 164.

FIGS. 7A and 7B illustrate a 3-1 actuator 160-1 and a 3-3 third actuator 160-3 which rotate the first movable body 130 in the first axis A1 direction (or Y-axis direction). Although not illustrated, the first movable body 130 may rotate about various axes (e.g., the first axis A1 or the second axis A2 in FIG. 2B) orthogonal to the optical axis by the plurality of third actuators including the 3-1 actuator 160-1 or the 3-3 actuator 160-3.

Referring to FIG. 7A, as a current is applied to the 3-1 driving coil 162-1, a repulsive force may be created between the 3-1 driving magnet 161-1 and the 3-1 driving coil 162-1, such that the first movable body 130 may rotate in a counterclockwise direction. Additionally, or alternatively, as a current is applied to the 3-3 driving coil 162-3, an attractive force may be created between the 3-3 driving magnet and the 3-3 driving coil 162-3, such that the first movable body 130 may rotate in a counterclockwise direction with respect to the fixed body 170.

Referring to FIG. 7B, as current is applied to the 3-1 driving coil 162-1, an attractive force may be created between the 3-1 driving magnet 161-1 and the 3-1 driving coil 162-1, such that the first movable body 130 may rotate in a clockwise direction. Additionally, or alternatively, as a current is applied to the 3-3 driving coil 162-3, a repulsive force may be created between the 3-3 driving magnet and the 3-3 driving coil 162-3, such that the first movable body 130 may rotate in a clockwise direction with respect to the fixed body 170.

In an example embodiment, one of the 3-1 actuator 160-1 or the 3-3 actuator 160-3 in the third OIS driver may not be provided. This is because the 3-1 actuator 160-1 and the 3-3 actuator 160-3 may rotate the first movable body 130 in a clockwise or counterclockwise direction.

2.4. Deformation of Flexible Substrate

FIGS. 8A, 8B, 8C, and 8D illustrate the deformation of a substrate 140 according to movement of a movable body 110.

Figure 8A:
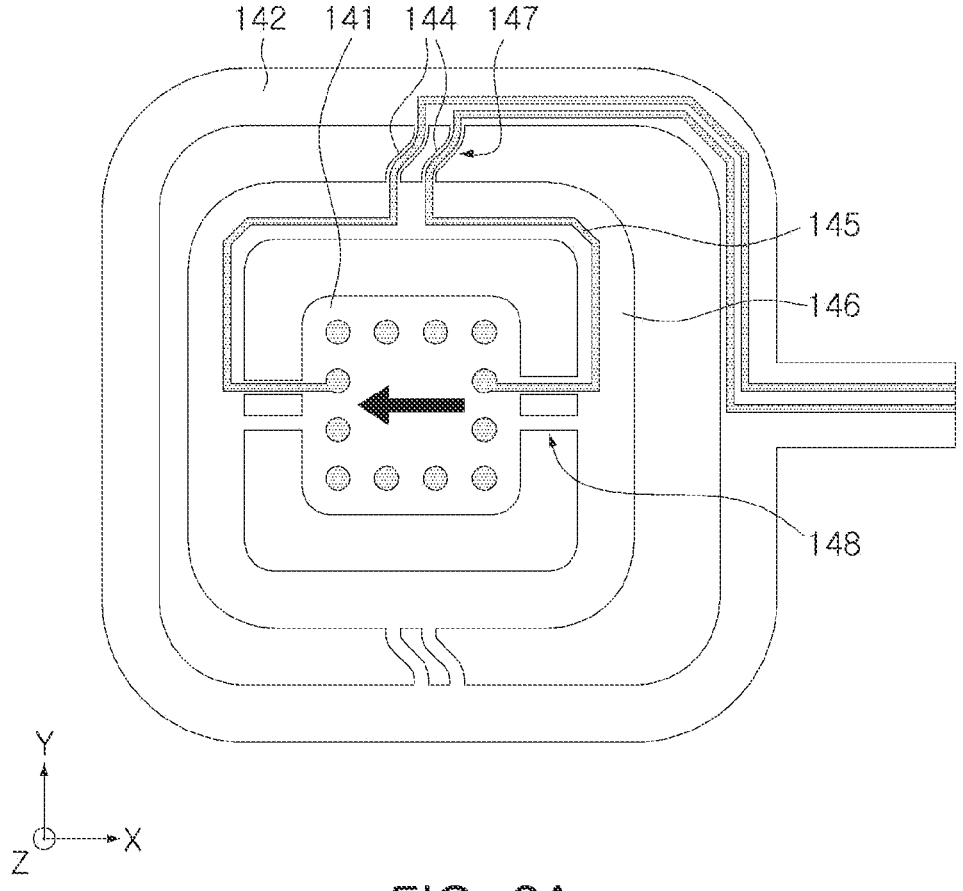
FIG. 8A, FIG. 8B, FIG. 8C, and FIG. 8D illustrate the deformation of a substrate, in accordance with one or more embodiments.

Referring to FIG. 8A, when the second movable body 110 moves in the −X-direction, the movable portion 141 of the substrate 140 may also move in the −X-direction, and accordingly, the first bridge 147 connecting the guide 146 to the fixed portion 142 may be deformed. Since the bridge elements 144 included in the first bridge 147 may have elasticity, the deformed first bridge 147 may provide resilient force to allow the movable portion 141 to return in a direction (the +X-direction) opposite to the movement direction. Accordingly, when no current is applied to the first OIS driver, the movable portion 141 may move in the −X-direction.

Figure 8B:
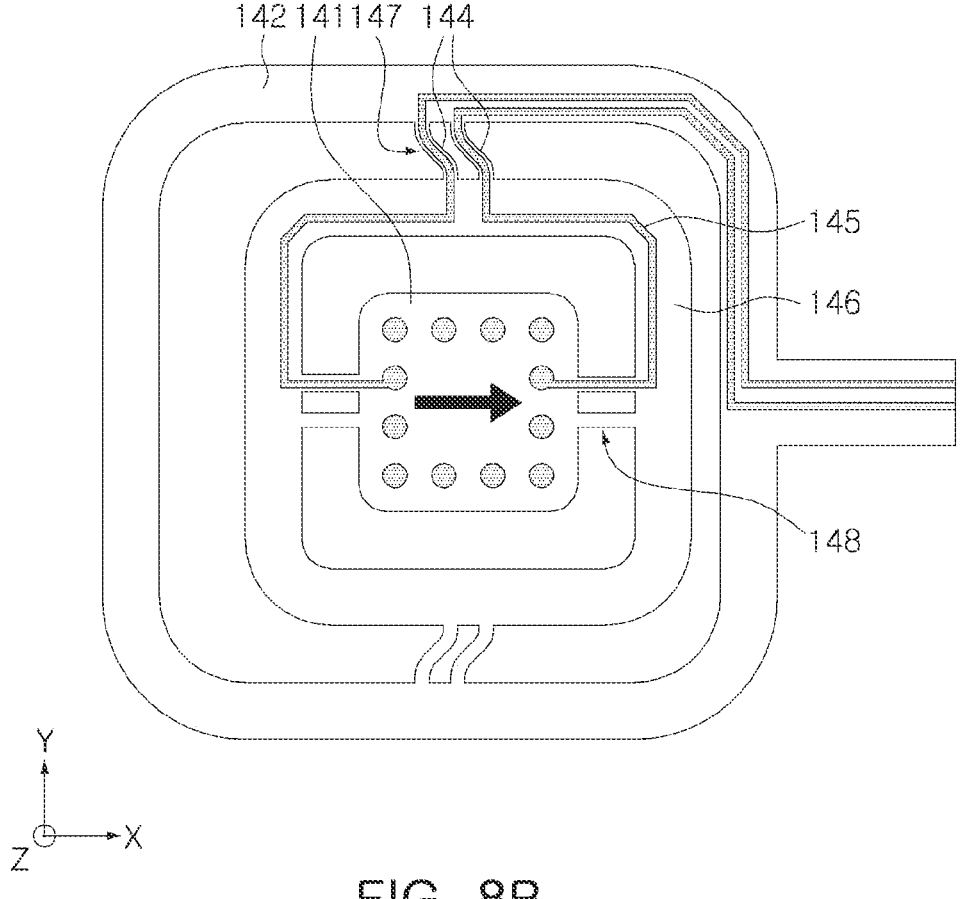

Referring to FIG. 8B, when the second movable body 110 moves in the +X-direction, the movable portion 141 of the substrate 140 may also move in the +X-direction, and accordingly, the first bridge 147 connecting the guide 146 to the fixed portion 142 may be deformed. Since the bridge elements 144 included in the first bridge 147 have elasticity, the deformed first bridge 147 may provide resilient force to allow the movable portion 141 to return in the direction (the −X-direction) opposite to the moving direction.

Figure 8C:
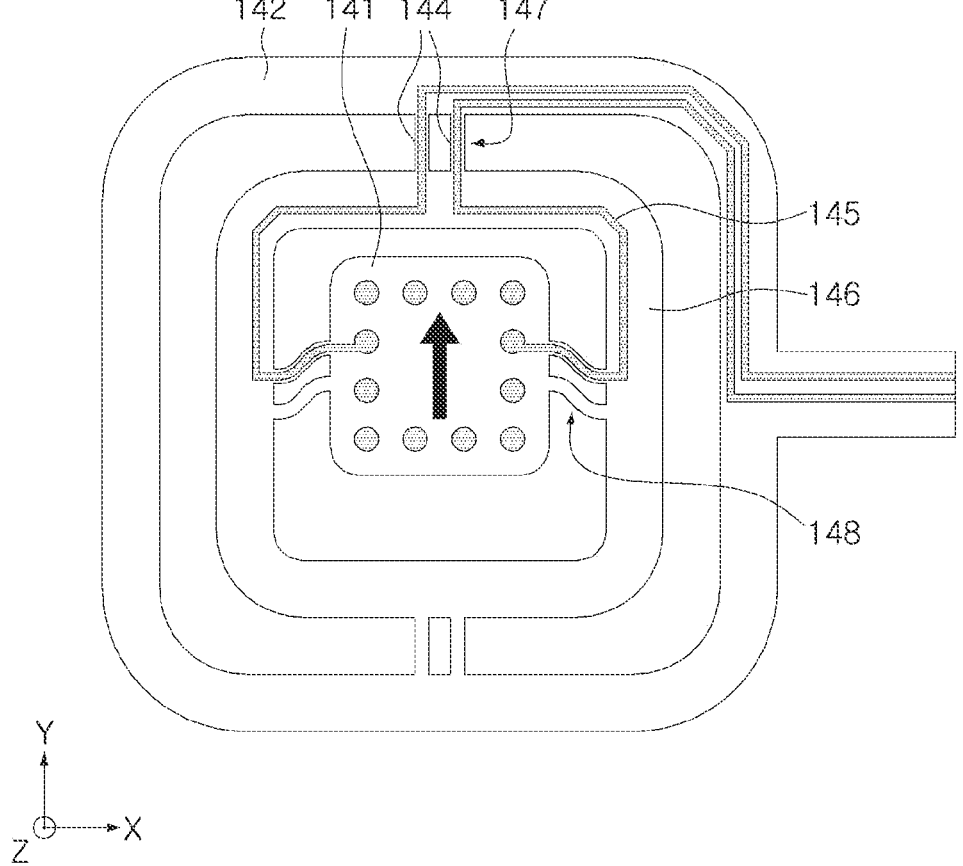

Referring to FIG. 8C, when the second movable body 110 moves in the +Y-direction, the movable portion 141 of the substrate 140 may also move in the +Y-direction, and accordingly, the second bridge 148 connecting the guide 146 to the fixed portion 142 may be deformed. Since the bridge elements 144 included in the second bridge 148 have elasticity, the deformed second bridge 148 may provide resilient force to allow the movable portion 141 to return in the direction (the −Y-direction) opposite to the moving direction.

Figure 8D:
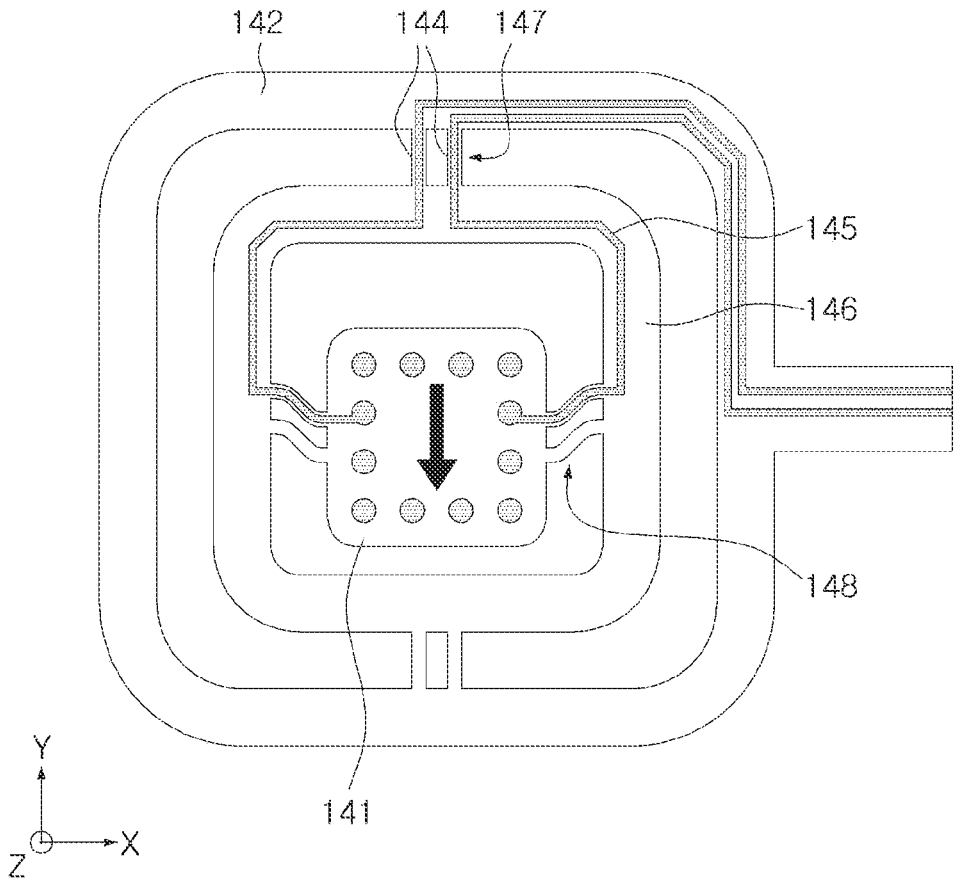

Referring to FIG. 8D, when the second movable body 110 moves in the −Y-direction, the movable portion 141 of the substrate 140 may also move in the −Y-direction, and accordingly, the second bridge 148 connecting the guide 146 to the fixed portion 142 may be deformed. Since the bridge elements 144 included in the second bridge 148 have elasticity, the deformed second bridge 148 may provide resilient force to allow the movable portion 141 to return in the direction (the +Y-direction) opposite to the moving direction.

3. Sensor Shift AF

Figure 9:
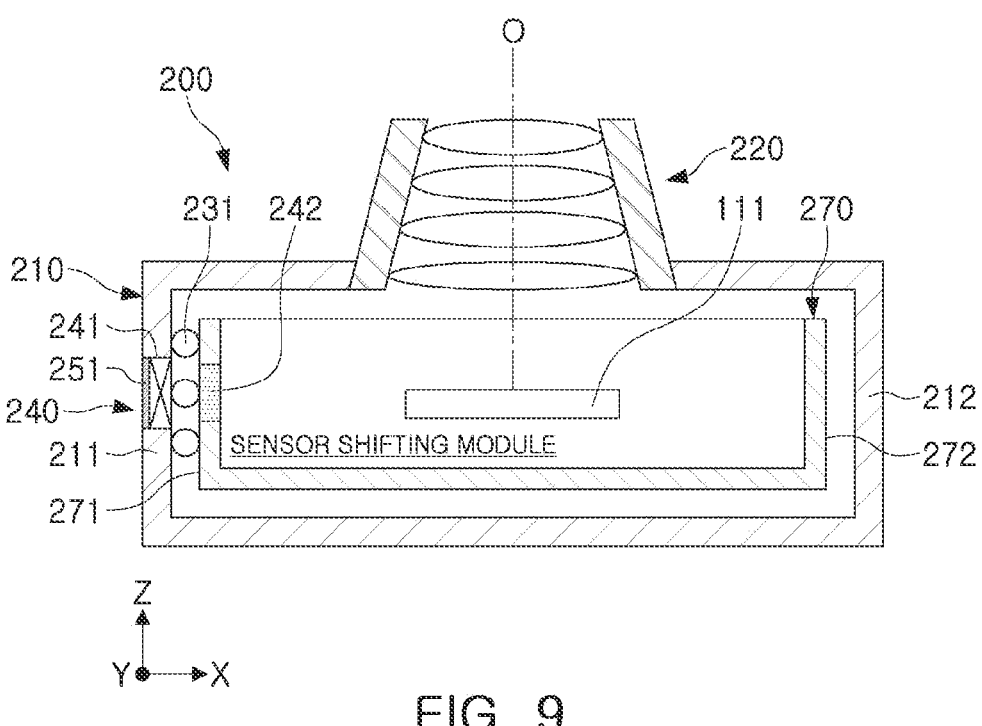
FIG. 9 illustrates an example camera module, in accordance with one or more embodiments.
Figure 10:
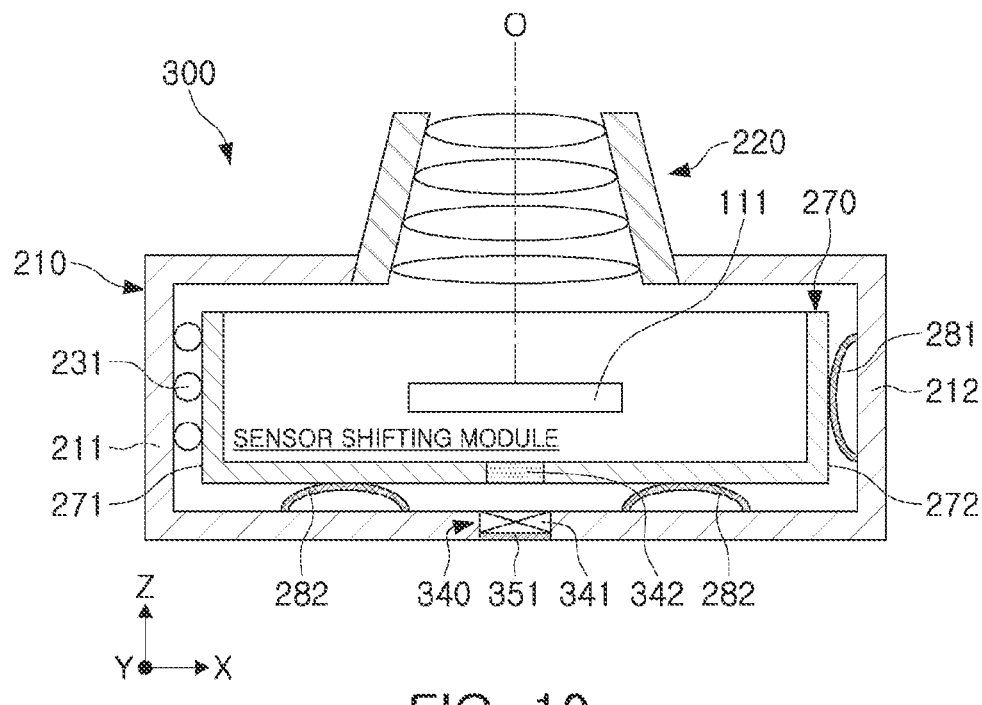
FIG. 10 illustrates an example camera module, in accordance with one or more embodiments.

FIG. 9 illustrates an example camera module 200 according to a first example embodiment. FIG. 10 illustrates an example camera module 300, in accordance with one or more embodiments.

Referring to FIGS. 9 and 10, in an example embodiment, the camera modules 200 and 300 may include a housing 210, a lens barrel 220, an image sensor 111, an AF carrier 270 and an AF driver. The lens barrel 220 may include at least one lens, and may be coupled to the housing 210. The image sensor 111 may be movably coupled to the AF carrier 270. For example, the AF carrier 270 and the image sensor 111 may respectively correspond to the fixed body 170 and the image sensor 111 in FIG. 2A.

A sensor shifting module may be disposed in the AF Carrier 270. The sensor shifting module may include a portion, or an entirety, of the components included in the sensor shifting module 100 described with reference to FIGS. 2A to 8D. For example, the sensor shifting module may include a driver configured to move the image sensor 111 in a direction orthogonal to the optical axis O with respect to the AF carrier 270, to rotate the image sensor 111 about an axis parallel to the optical axis O, or to rotate the image sensor 111 about an axis orthogonal to the optical axis O.

The AF driver may include a ball guide structure, a pooling device, and an AF actuator. The AF driver in FIGS. 9 and 10 may correspond to the second AF driver in FIG. 1.

Referring to FIG. 9, the image sensor 111 may be mounted on the AF carrier 270, and the AF carrier 270 may move in the direction of the optical axis O with respect to the housing 210. A ball member 231 may be disposed between the AF carrier 270 and the housing 210. The ball member 231 may include a plurality of balls.

The ball member 231 may be disposed between the first side surface 271 of the AF carrier 270 and the first sidewall 211 of the housing 210. A guide groove for partially accommodating the ball member 231 may be formed in the first side surface 271 of the AF carrier 270 and the first sidewall 211 of the housing 210. The guide groove may extend in a direction parallel to the optical axis O and may guide movement of the AF carrier 270 in the optical axis O direction.

The AF actuator 240 may be disposed between the AF carrier 270 and the housing 210. The AF actuator 240 may include the AF coil 241 and the AF magnet 242 opposing each other. In an example embodiment, the AF coil 241 and the AF magnet 242 may be disposed in the housing 210 and the AF Carrier 270, respectively. In another example embodiment, the AF coil 241 and the AF magnet 242 may be disposed in the AF Carrier 270 and the housing 210, respectively.

In an example embodiment, the AF actuator 240 may include the AF coil 241 and the AF magnet 242 opposing each other in the direction (e.g., the X-direction) orthogonal to the optical axis O. When the current flows in the AF coil 241, the AF carrier 270 may move in the optical axis O direction with respect to the housing 210 by electromagnetic interaction (e.g., Lorentz force) between the AF coil 241 and the AF magnet 242.

A device that pulls the AF carrier 270 to the sidewall of the housing 210 may be disposed between the AF carrier 270 and the housing 210. In an example embodiment, referring to FIG. 9, the pulling yoke 251 may be disposed on one side of the AF coil 241, and the AF carrier 270 may be pulled by attractive force between the pulling yoke 251 and the AF magnet 242 toward the first sidewall 211 of the housing 210. Accordingly, the ball member 231 may maintain to be in contact with the AF carrier 270 and the housing 210, and accordingly, the AF carrier 270 may move smoothly in the optical axis O direction.

Referring to FIG. 10, in an example embodiment, the AF actuator 340 may be disposed below the AF carrier 270. For example, the AF magnet 342 may be disposed on the lower surface of the AF carrier 270, and the AF coil 341 may be disposed on the bottom surface of the housing 210. In an example embodiment, the AF magnet 342 and the AF coil 341 may oppose each other in a direction parallel to the optical axis O (e.g., the Z-direction). When a current flows in the AF coil 341, an attractive force or a repulsive force may be created between the AF coil 341 and the AF magnet 342 such that the AF carrier 270 may move in the optical axis O direction.

Referring to FIG. 10, a first elastic member 281, that pushes the AF carrier 270 to the first sidewall 211 of the housing 210, may be disposed between the AF carrier 270 and the housing 210. The ball member 231 may be disposed on a first side of the AF carrier 270, and the first elastic member 281 may be disposed on a second side of the AF carrier 270. The first elastic member 281 may be disposed between the AF carrier 270 and the housing 210, and may push the AF carrier 270 in the direction in which the ball member 231 is disposed. Accordingly, the ball member 231 may be maintained in contact with the AF carrier 270 and the housing 210, and accordingly, the AF carrier 270 may move smoothly in the optical axis O direction. The first elastic member 281 may be configured as a leaf spring. For example, the first elastic member 281 may be provided in the form of a leaf spring bent to be curved toward the AF carrier 270 (in the +Z-direction).

Referring to FIG. 10, the yoke 351 may be disposed on one side of the AF coil 341, and a magnetic attraction force may be created between the yoke 351 and the AF magnet 342 such that the AF carrier (270) may be pulled to the bottom surface of the housing 210. In an example embodiment, the AF driver may include a second elastic member 282 disposed below the AF carrier 270. The second elastic member 282 may support the AF carrier 270. When the AF carrier 270 moves in the optical axis O direction from the initial position, the second elastic member 282 may be deformed such that the second elastic member 282 may provide restoring force for allowing the AF carrier 270 to return the initial position. The second elastic member 282 may be provided in the form of a leaf spring. For example, referring to FIG. 10, the second elastic member 282 may be configured as a leaf spring bent to be curved toward the AF carrier 270. The first elastic member 281 and/or the second elastic member 282 in FIG. 10 may also be applied to the camera module 200 illustrated in FIG. 9.

4. Additional Example Embodiment of Camera Module

Figure 11:
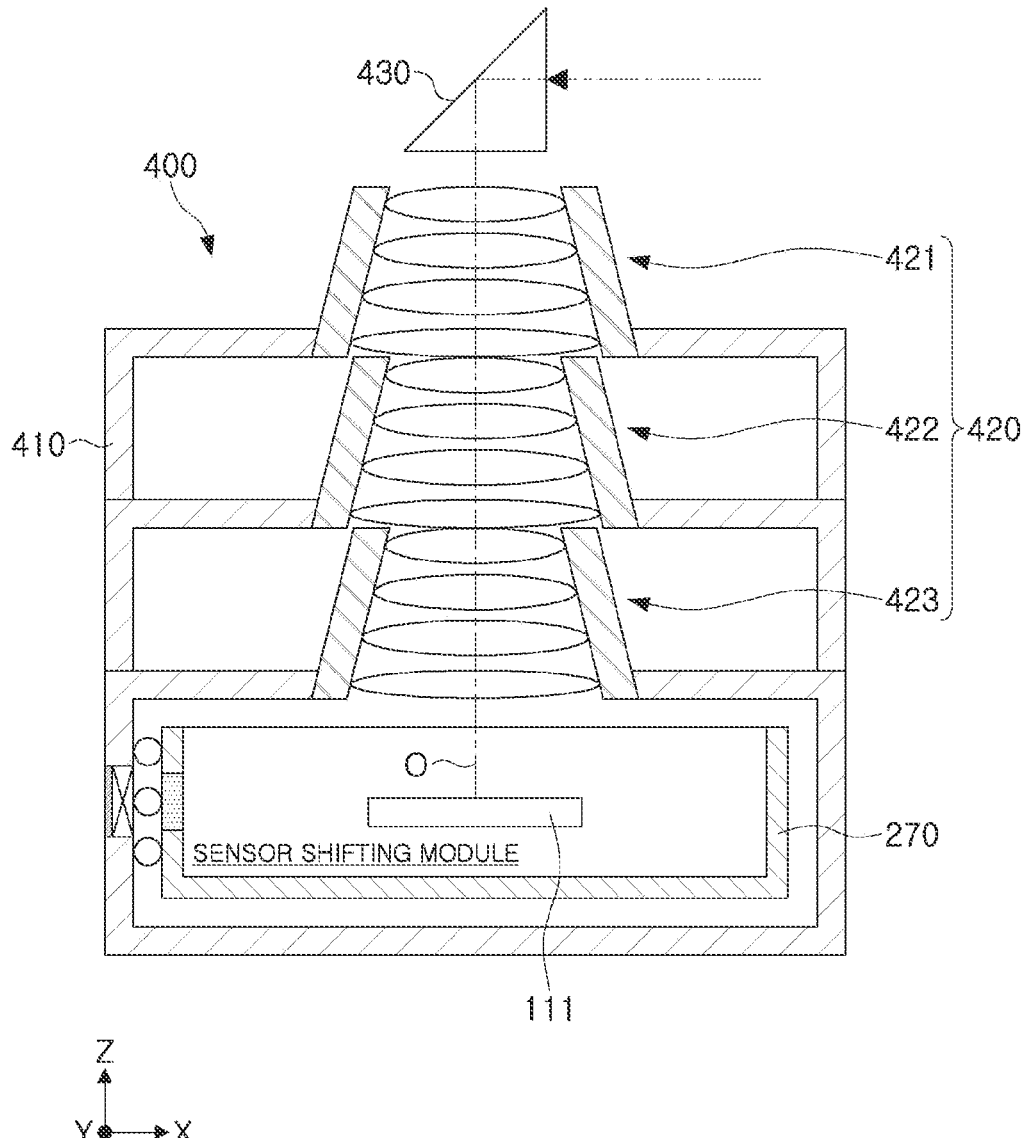
FIG. 11 and FIG. 12 illustrate an example camera module, in accordance with one or more embodiments.
Figure 12:
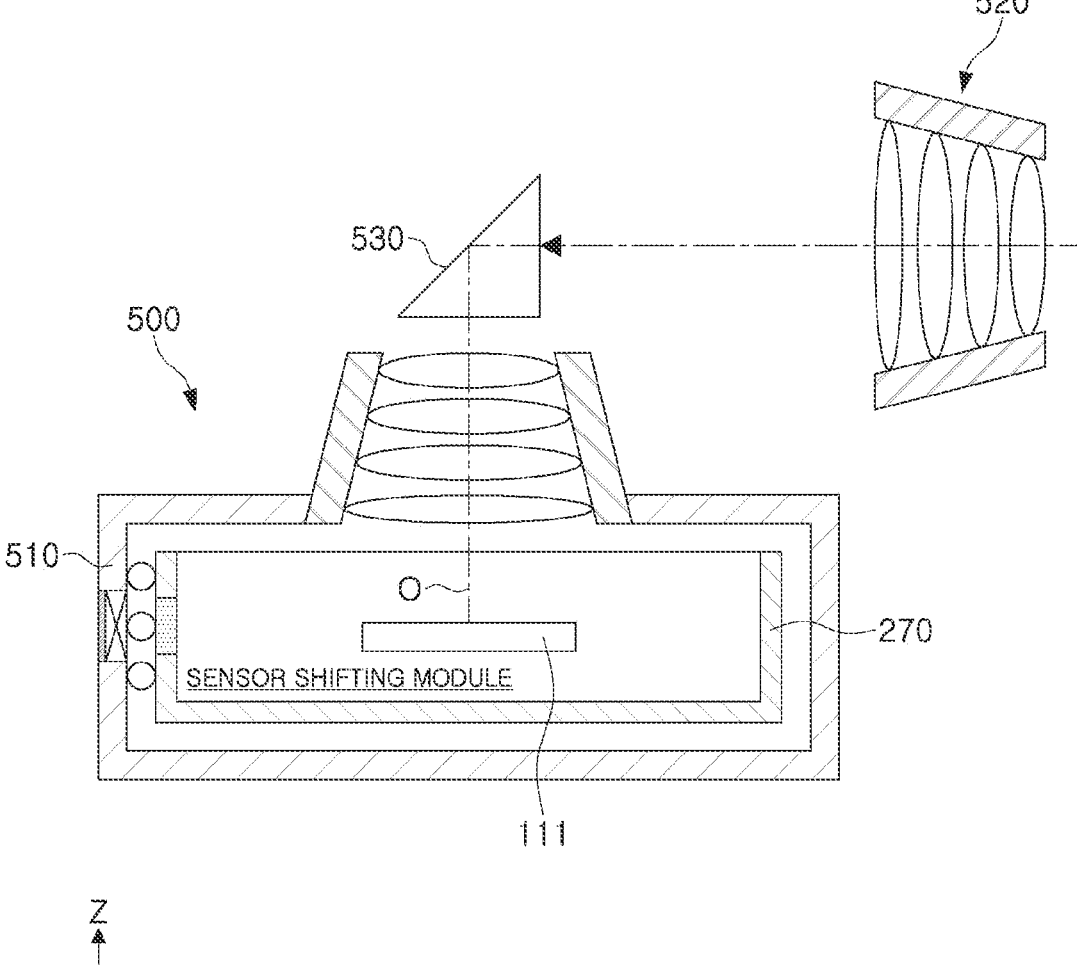

FIGS. 11 and 12 illustrate example camera modules 400 and 500, in accordance with one or more embodiments.

Referring to FIG. 11, the camera module 400 may include a plurality of lens barrels 420. For example, the camera module 400 may include three lens barrels 421, 422, and 423. The lens barrels 420 may be fixedly coupled to the housing 410. The camera module 400 may include an optical path changing member 430 disposed on the object side of the front lens barrel 421. The optical path changing member 430 may change a path of light, and may be configured as, for example, a prism or a mirror. In the housing 410, the AF carrier 270 including an image sensor 111 may be disposed to move in the optical axis direction, and the descriptions related to the components of the AF carrier 270 and the AF driving may be the same as the description described with reference to FIGS. 9 and 10.

Referring to FIG. 12, the optical path changing member 530 may be disposed in front of the image sensor 111, and the lens barrel 520 may be disposed on one side of the optical path changing member 530. Light passing through the lens barrel 520 may be reflected from the optical path changing member 530 and may reach the image sensor 111. In the housing 510, the AF carrier 270 including an image sensor 111 may be disposed in the optical axis direction, and the descriptions related to the components of the AF carrier 270 and the AF driving may be the same as the description described with reference to FIGS. 9 and 10.

According to the aforementioned example embodiments, the camera may provide an effective autofocusing function and an effective optical image stabilization function with low power. Additionally, an improved shaking correction function may be implemented by driving the image sensor in various directions.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a carrier, disposed in the housing, and configured to move in a first direction;
   an image sensor movably disposed in the carrier, and configured to move in a second direction different from the first direction with respect to the carrier;
   a first movable body movably disposed in the carrier;
   a second movable body movably disposed in the first movable body and coupled to the image sensor; and
   an autofocusing driver comprising an autofocusing actuator configured to move the carrier in the first direction with respect to the housing, and a ball member disposed between a first side surface of the carrier and a first sidewall of the housing.

2. The camera module of claim 1, wherein the image sensor has an imaging plane oriented in the first direction.

3. The camera module of claim 1, wherein the autofocusing actuator comprises an autofocusing coil disposed on a first side of the carrier and coupled to one of the housing and the carrier, and an autofocusing magnet coupled to the other of the housing and the carrier and opposing the autofocusing coil in a direction orthogonal to the first direction.

4. The camera module of claim 3, further comprising a yoke disposed on one side of the autofocusing coil.

5. The camera module of claim 1, wherein the autofocusing actuator comprises an autofocusing coil disposed below the carrier and coupled to one of the housing and the carrier, and an autofocusing magnet coupled to the other of the housing and the carrier and opposing the autofocusing coil in the first direction.

6. The camera module of claim 5, further comprising:
   a first elastic member disposed between the carrier and the housing,
   wherein the ball member is disposed on a first side of the carrier, and the first elastic member is disposed on a second side of the carrier, and is configured to push the carrier toward the ball member.

7. The camera module of claim 5, further comprising:
   a second elastic member disposed between a lower portion of the carrier and the housing, and configured to support the carrier in the first direction.

8. The camera module of claim 1, further comprising:
   a first driver configured to move the second movable body in a direction orthogonal to the first direction with respect to the first movable body;
   a second driver configured to rotate the second movable body about an axis parallel to the first direction with respect to the first movable body; and
   a third driver configured to rotate the first movable body about an axis orthogonal to the first direction with respect to the carrier,
   wherein the third driver is disposed between the carrier and the first movable body and provides a tilt center of the first movable body with respect to the carrier.

9. The camera module of claim 8, wherein the first driver comprises a first actuator disposed between the first movable body and the second movable body, and the first actuator comprises a first driving magnet disposed on the second movable body, and a first driving coil disposed on the first movable body to oppose the first driving magnet in a direction orthogonal to the first direction.

10. The camera module of claim 9, wherein the second driver comprises a second actuator disposed between the first movable body and the second movable body, and the second actuator comprises a second driving magnet disposed on the second movable body, and a second driving coil disposed on the first movable body to oppose the second driving magnet in a direction orthogonal to the first direction.

11. The camera module of claim 10, wherein the second movable body comprises four side surfaces which form a quadrangular shape, and the first driving magnet and the second driving magnet are disposed on different side surfaces among the four side surfaces.

12. The camera module of claim 11, wherein the second movable body comprises a first side surface and a second side surface which form a corner, and the second driving magnet is disposed on one of the first side surface and the second side surface, and is disposed adjacent to the corner.

13. The camera module of claim 10, wherein the third driver comprises a third actuator disposed between the first movable body and the carrier, and the third actuator comprises a third driving magnet disposed on the second movable body, and a third driving coil disposed on the carrier to oppose the third driving magnet in the first direction.

14. The camera module of claim 13, wherein the third driving magnet is one of the first driving magnet and the second driving magnet.

15. The camera module of claim 8, further comprising:
   a substrate which mechanically connects the second movable body to the first movable body, and is deformed based on a movement of the second movable body with respect to the first movable body.

16. The camera module of claim 15, wherein the substrate comprises electrical wirings which are electrically connected to the image sensor.

17. The camera module of claim 16,
   wherein the substrate comprises a movable portion fixedly coupled to the second movable body, a fixed portion fixedly coupled to the first movable body, and a supporting portion that interconnects the movable portion and the fixed portion, and wherein the supporting portion comprises a plurality of bridges configured to embed the electrical wirings therein.

18. The camera module of claim 17, wherein the supporting portion comprises a guide disposed between the movable portion and the fixed portion, and connected to the movable portion and the fixed portion through the plurality of bridges.

19. A camera module, comprising:

a housing;

a carrier, disposed in the housing, and configured to move in a first direction;

a first movable body movably disposed in the carrier;

a second movable body movably coupled to the first movable body;

an image sensor coupled to the second movable body, and having an imaging plane oriented in the first direction; and a substrate that mechanically connects the second movable body to the first movable body, and is configured to deform based on a movement of the second movable body with respect to the first movable body.

20. The camera module of claim 19, wherein the substrate comprises a movable portion fixedly coupled to the second movable body, a fixed portion fixedly coupled to the first movable body, and a supporting portion that interconnects the movable portion and the fixed portion, wherein the supporting portion comprises a plurality of bridges embedding electrical wirings electrically connected to the image sensor therein.

21. The camera module of claim 19, further comprising:

a first driver configured to move the second movable body in a direction orthogonal to the first direction with respect to the first movable body;

a second driver configured to rotate the second movable body about an axis parallel to the first direction with respect to the first movable body; and a third driver configured to rotate the first movable body about an axis orthogonal to the first direction with respect to the carrier, wherein the third driver comprises a tilt guide ball disposed between the carrier and the first movable body and configured to provide a tilt center of the first movable body with respect to the carrier.

22. A camera module, comprising:

a housing;

an autofocus (AF) carrier disposed in the housing, and configured to move in an optical axis direction;

a tilting carrier disposed on the AF carrier, and configured to tilt relative to a fixed body with respect to an axis orthogonal to the optical axis;

a movable body disposed on the tilting carrier;

an image sensor coupled to the movable body;

a substrate, coupled to the tilting carrier and the movable body, and configured to deform based on a movement of the movable body with respect to the tilting carrier, and a ball member disposed between a first side surface of the AF carrier and a first sidewall of the housing.

23. The camera module of claim 22, wherein the substrate comprises:

a movable portion on which the sensor is disposed;

a fixed portion that is fixed to the tilting carrier; and a supporting portion that connects the movable portion to the fixed portion, wherein at least a portion of the supporting portion is configured to deform based on a movement between the movable portion and the tilting carrier.

24. The camera module of claim 22, further comprising ball members disposed between the AF carrier and the housing, and configured to move the AF carrier in the optical axis direction.

* * * * *